United States Patent [19]

Siwoff

[11] Patent Number: 5,359,675
[45] Date of Patent: Oct. 25, 1994

[54] VIDEO SPECTACLES

[76] Inventor: Ronald Siwoff, 216 Finderne Ave., Bridgewater, N.J. 08807

[21] Appl. No.: 896,421

[22] Filed: Jun. 9, 1992

Related U.S. Application Data

[63] Continuation-in-part of Ser. No. 558,317, Jul. 26, 1990, Pat. No. 5,125,046.

[51] Int. Cl.⁵ .......................... G06K 9/40; H04N 7/00
[52] U.S. Cl. .......................................... 382/54; 382/6; 348/62; 348/63; 345/8
[58] Field of Search .................. 358/94, 168, 169; 434/36, 43, 69, 112, 307, 308; 382/50, 54, 6, 47; 340/705, 980, 781; 345/7.8; 348/62, 28, 63, 678

[56] References Cited

U.S. PATENT DOCUMENTS

| 4,394,774 | 7/1983 | Widergren | 382/56 |
| 4,642,694 | 2/1987 | Yamagishi et al. | 358/169 |
| 4,688,879 | 8/1987 | Fairchild | 350/3.7 |
| 4,689,741 | 8/1987 | Redwine | 364/200 |
| 4,772,956 | 9/1988 | Roche | 358/260 |
| 4,878,046 | 10/1989 | Smith | 340/705 |
| 4,902,083 | 2/1990 | Wells | 350/6.6 |
| 4,907,288 | 3/1990 | Shimoni | 382/54 |
| 5,117,284 | 5/1992 | Mori et al. | 358/79 |
| 5,153,569 | 10/1992 | Kawamura et al. | 340/705 |
| 5,159,927 | 11/1992 | Schmid | 358/94 |
| 5,189,512 | 2/1993 | Cameron et al. | 358/93 |

OTHER PUBLICATIONS

Walker et al., "Helmet mounted display system for attack helicopters", Oct. 1980, 129-130.
Symposium Paper entitled "Limitations of Image Enhancement for the Visually Impaired" by Eli Peli Jul. 16, 1991 pp. 32-41.
Symposium Paper entitled "Obstacles Encountered in the Developent of the Low Vision Enhancement System" by Robert W. Massof and Douglas L. Rickman Jun. 3, 1991 pp. 15-24.

Primary Examiner—Leo H. Boudreau
Assistant Examiner—Chris Kelley

[57] ABSTRACT

A spectacle mounted display is used in conjunction with a digitally enhanced imager for capturing, enhancing and projecting images to improve readability by individuals with impaired vision. The individual wears mirrored spectacles connected to a digitally enhanced imager to selectively enhanced contract, spatial frequency and wave length with or without enlargement.

17 Claims, 17 Drawing Sheets

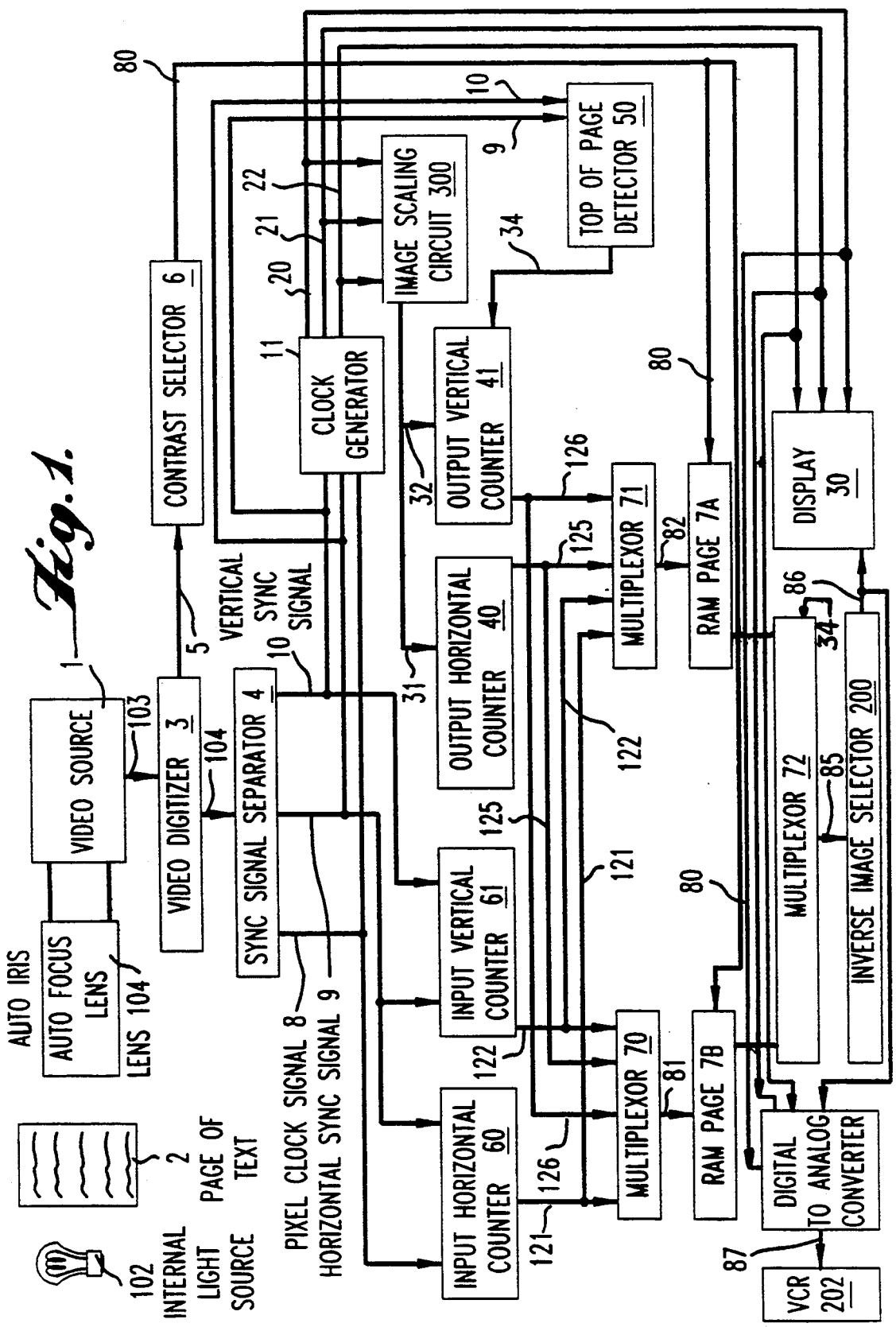

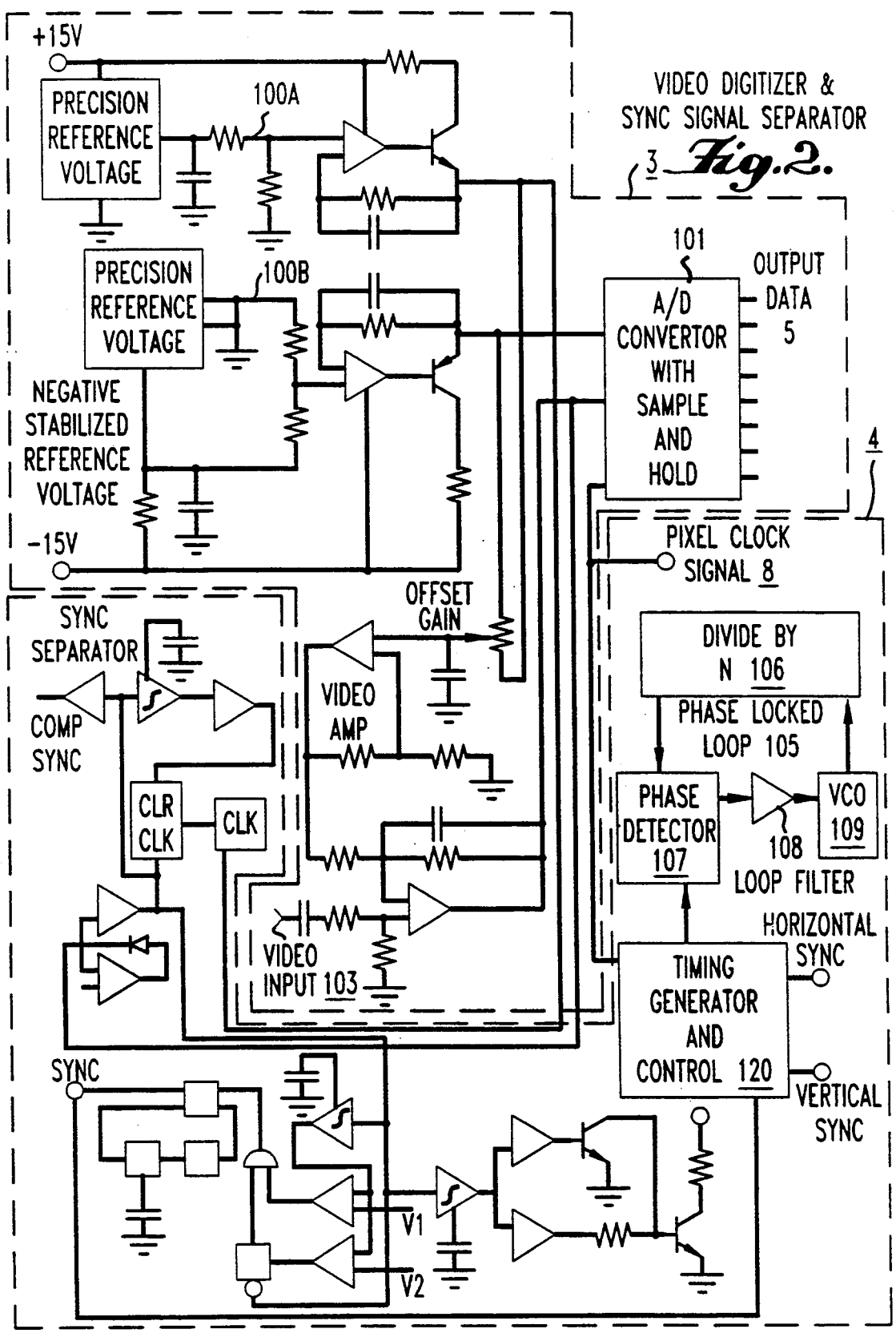

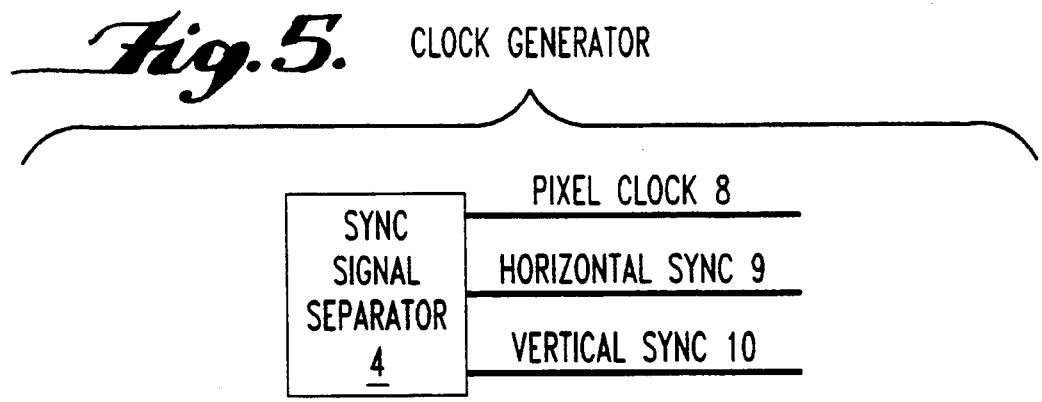
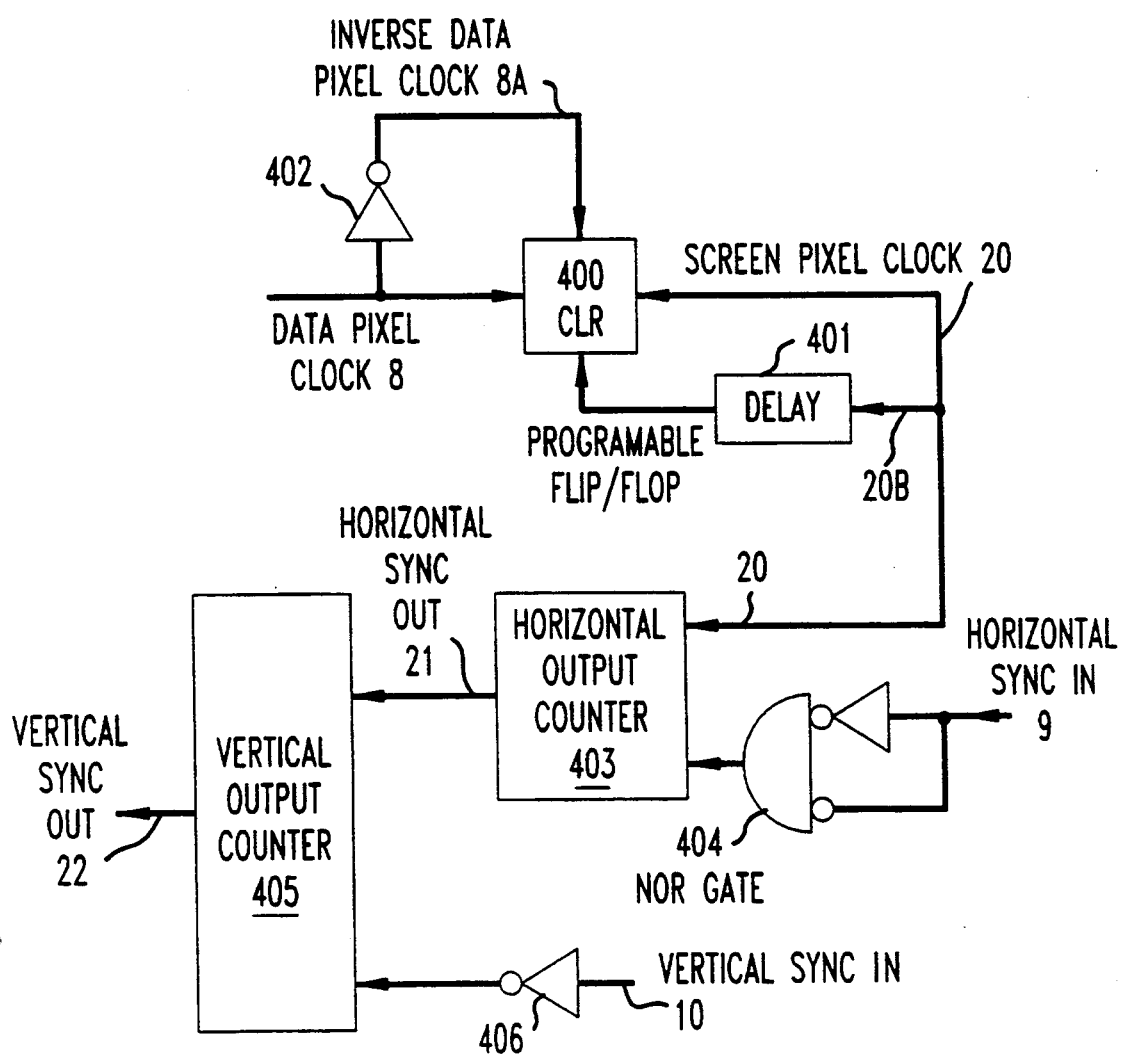
Fig. 5.

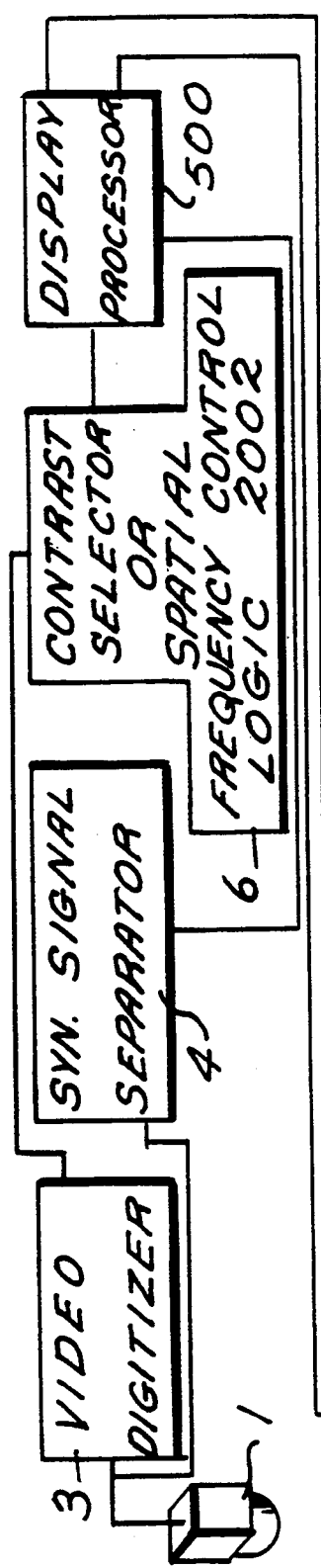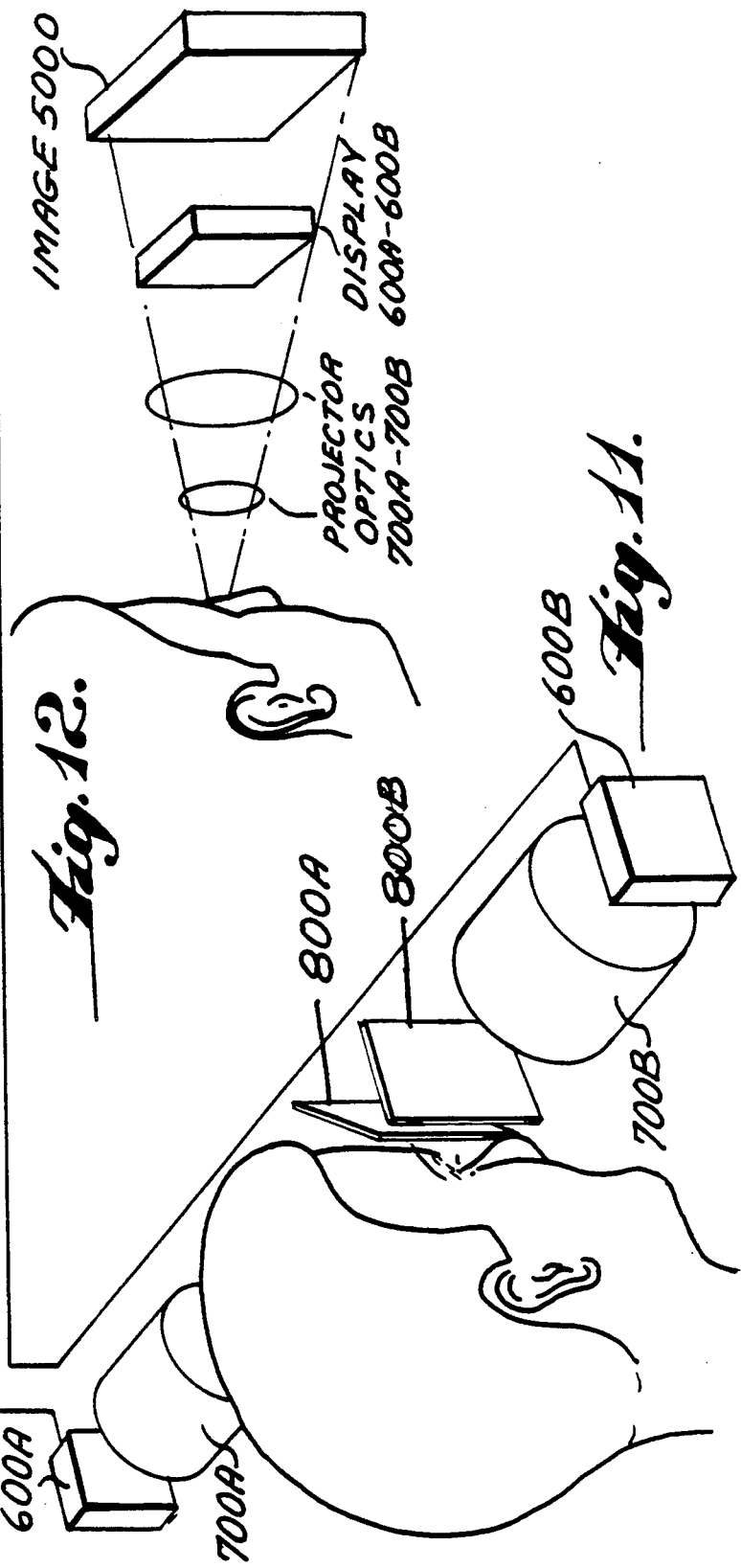
Fig. 12.
Fig. 11.

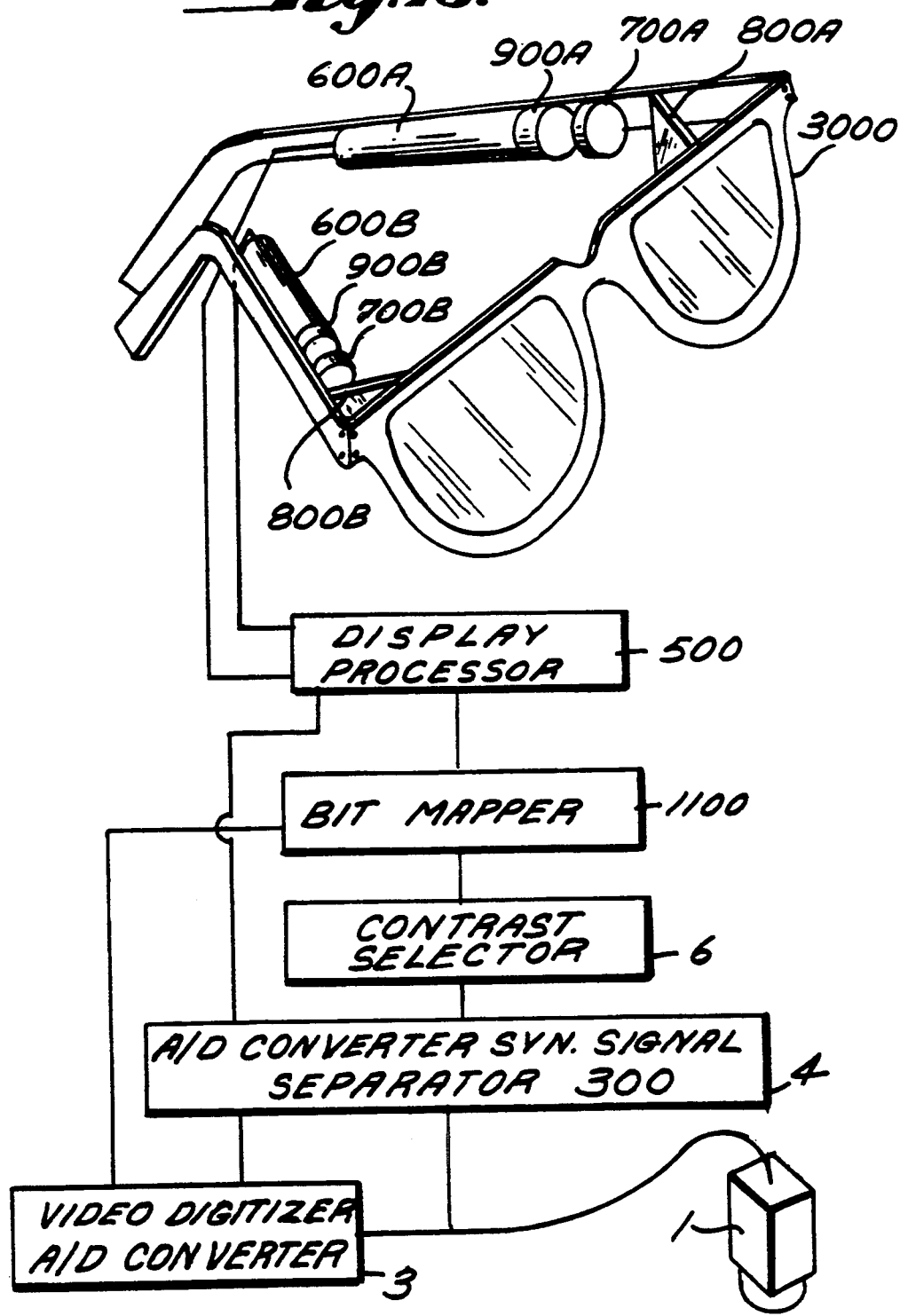

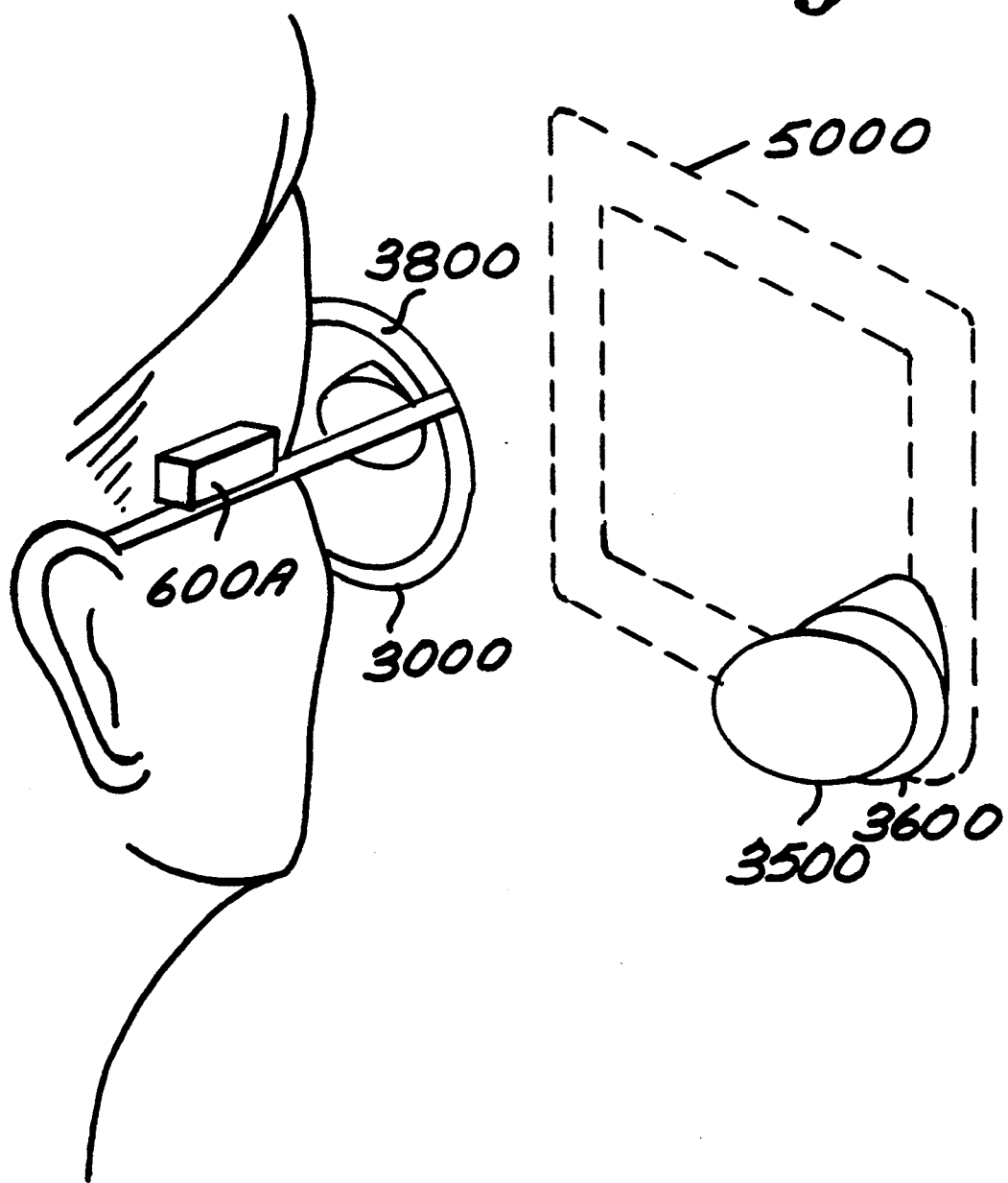

VIDEO SPECTACLES

CROSS REFERENCE TO RELATED APPLICATIONS

This is a continuation-in-part of application Ser. No. 558,317, filed Jul. 26, 1990 now U.S. Pat. No. 5,125,046.

BACKGROUND OF THE INVENTION

Field of the Invention

This invention relates to a method and apparatus for generating high contrast, high resolution images, with or without enlargements. More specifically, this invention relates to a method and apparatus for generating video or digitized images in two or three dimensions and a spectacle mounted display. When used in conjunction with a digitally enhanced imager for people with a vision impairment, visual information of various spatial frequencies, contrast, and wave length can be selectively enhanced and projected into a person's eye to compensate for the visual impairment.

The device can produce stereoscopic three dimensional images because each eye gets a separate image. Images can be in black and white or color.

An image can be described by contrast, spatial frequency, resolution and wave length. Contrast is defined as the difference in intensity or brightness between the light and dark areas of the image. The spatial frequency is defined as the inverse of the angular separation between component lines which make up an image. The resolution is the angular subtense of the smallest point visible to the observer. The wave length of visible light extends from 380 nm for violet-blue to about 750 nm deep red.

Individuals with impaired vision have vision that is contrast dependent. The ability of a person with a visual impairment to properly perceive an image is dependent on the contrast of the image. Many times people attempt to read a magnified image and they report it looks bigger but not clearer. Increasing brightness of the text and increasing the darkness of the background makes the print more legible even if the print size remains the same.

In addition to contrast, the resolution of an optical or electro-optical system will determine its visibility. Resolution is defined as the minimum angular separation of the details of a character. For example, the letter E can be made more legible by increasing the contrast between the spaces and the lines of the letter. In general, the sharper the delineation between the text and the background, that is, the narrower the width of the transition area between the text and the background, the higher the resolution and the sharper the image. In addition, studies of individuals with impaired vision have shown that increased spacing between characters also enhances readability.

In a conventional analog video display system, which includes a camera, monitor, transmitter and receiver, the image is limited by the contrast, spatial frequency and resolution of the objects whose images are being captured and transmitted by the camera. The image is further limited by the resolution of the video display device such as a monitor. The contrast in the image cannot be modified between discrete portions of the image such as brightening a light background and darkening dark letters; nor, can the visibility be enhanced by substantially reducing the transition between light and dark areas in the image on the monitor. This problem of visibility is aggravated when the images are enlarged substantially, a frequent requirement for improving readability of text for individuals with impaired vision.

There are also numerous devices which use digitized video images but these are primarily directed toward compressing the information into a narrow band width such as described in U.S. Pat. No. 4,394,774 Widergren, which describes a digital video compression system directed at NTSC color broadcast compression and expansion systems or in U.S. Pat. No. 4,772,956 Roche, which also is directed at a video transceiver including a compressor to reduce the time required to transmit and digitize a video frame over a narrow band width channel.

Neither of the inventions described in Widergren or Roche or other inventions such as that described in U.S. Pat. No. 4,689,741 Redwine, which is directed at memory devices designed to reduce or prevent the transfer of spurious or non-valid signals from the video storage circuit to the video display device or processor are designed to enhance contrast or resolution.

There are numerous devices which have been used to enhance and enlarge images in the prior art.

Closed circuit video has been used as an adaptive device for individuals with impaired vision for the past twenty years with only minor modification. Appollo Laser, Sun Chemical, Visual Tech, and more recently Telesensory and Enabling Technology all have used this technology to enlarge print. As indicated previously, simply enlarging print does not mean enhanced visual performance for many individuals with impaired vision.

A standard video image such as that displayed on a television screen is composed of 525 lines disposed from top to bottom which are scanned horizontally at 15.75 KHz. The electron beam which creates the image scans every other line and then returns to fill in the skipped lines. The first half of the lines (262.5) is scanned in 1/60th of a second, followed by the second half in the next 1/60th of a second. The interlaced scanning reduces flicker. Thus, each frame which is made up of the 525 lines is scanned in 1/30th of a second at a rate of 15.75 KHz. The three widely used standards, including the Monochrome RS-170, NTSC and European PAL, are all essentially equivalent for the purposes of the present invention.

Modern video signals have not changed much since the Iconoscope, which was first described in 1923 by Vladimir Kosma Zworykin. Mr. Zworykin received a patent for this device in December, 1938. Subsequently RCA patented a picture tube called a kinescope.

For a video image to be formed on a picture tube two conditions must be met. First, the beam striking the screen must be able to release more light as the voltage of the video signal increases. Second, the electron beam of the camera and the picture must scan at the same rate. These scan rates are locked together by a sync pulse that is embedded in the video signal that occurs at the end of every line. By digitizing the image and increasing the scan rate as embodied in this invention the resolution of the image can be enhanced. By digitizing the image and using comparators and digital filters the contrast and spatial frequencies can be enhanced. This significantly improves the image quality beyond the prior art. High resolution, high speed displays, including flat panel displays (Fuanda et al., Ishii et al., Masit et al., Orceyre (Fr)), that do not use an electron gun to create the image, are capable of displaying high scan rate video images. A further advantage of flat panel displays are their light weight and thin compact shape which makes them readily portable.

There is nothing in the patents previously cited, nor in other areas of the art, directed toward contrast and resolution enhancement to improve the recognition of images, by individuals with impaired vision in real time processes.

SUMMARY OF THE INVENTION

As previously stated, vision is a contrast dependent function and the present invention can bring new freedom to people with impaired vision. Because this invention operates digitally, various new applications are possible. The enhanced images can be printed on a graphics printer, transmitted over telephone lines using conventional devices such as modems or stored for future reading. Non-real time applications, like conversion to speech, are also possible. In addition, other outputs like computer displays can be processed in a similar fashion to produce an enhanced video image.

Accordingly, the present invention includes a method and apparatus for displaying two and three dimensional video or digitized images through a spectacle mounted display. The spectacle mounted display is comprised of a micro display, projector optics, a mirror, a video DAC to convert the digital images produced by the Digital Enhanced Imager to analog images, and a series of multiplexors to combine the analog images with horizontal and vertical sync signals. The spectacle mounted system combines digital images with vertical and horizontal sync signals and digitally enhanced images to produce a nonlinear peak of contrast, selective enhancement of various spatial frequencies, and a shift in spatial frequency by enlarging the images.

It is not enough to magnify print to make it legible for many individuals with impaired vision, its contrast must be enhanced.

As previously stated, the present invention incorporates an electronic device which scans printed reading material, has the capacity to enlarge it optically or electronically, digitize it and manipulate it electronically so that its contrast, spatial frequency and resolution are enhanced, and finally the enhanced image is produced on a high resolution display.

This invention differs from prior art in that it expands and enhances the video image to be more easily read by an individual with impaired vision in real time. Input/output ports on conventional digital microprocessor or scanners all are too slow to process video signals in real time. This invention is capable of operating at extremely fast speeds that are required for real time image processing.

In the present invention, a monochrome video signal is input to an analog to digital converter and a sync signal separator. The analog to digital converter operates in a conventional manner and takes the analog data signal and makes it readable by the digital circuitry. The sync signal separator also operates in a conventional manner and receives the sync signal portion of the signal and separates it into pixel, horizontal and vertical clocks. All timing clocks and counters are synchronized to the sync signals from the video image. The digitized video data is processed by the contrast selector and is read into two pages of memory. The clock signals, including the pixel clock, horizontal and vertical sync signals, and top of page detector signal are sent to both pages of memory by two input counters controlling rows and columns so that the data is read into memory at the correct rate. The data is read out of both pages of memory at the required rate by two output counters. The input and output counters are controlled by two multiplexors. The data is read alternatively into two pages of memory. Accordingly, while one page receives data, page two sends data, then they reverse. The data is combined by an output multiplexor. The output from this multiplexor is combined in the output display device with the appropriate pixel, horizontal and vertical clock signals.

A clock generator produces all clocks, counters and sync signals. These new signals are sent to the multiplexors, the two pages of memory and the high resolution display. The digital data signal is read out of memory at the exact frequency for the screen and converted to an appropriate format for the screen. This synchronization can be accomplished by either a phase locked loop circuit or a programmable flip-flop such as a Signetics 74F50729 which is triggered on both the rising and the falling of incoming clock pulses. This dual triggering produces a doubling of the original frequency. This device will also function at the normal undoubled frequency, however, improved resolution is attained at the double frequency. The output data can be inverted to produce an inverse or negative image or a positive image. Conventional high resolution displays such as VGA or Super VGA displays are appropriate as output display devices.

The digitized video image contrast selector uses an electronic comparator to select which portions of the image will be displayed as bright or "white" and which portions will be dark or "black" on the output display.

The contrast selector, which allows the user to select one of sixteen levels of intensity, functions by comparing the intensity of the data for each discrete pixel with the intensity selected by the user. Only the four most significant bits of the eight bits produced by the digitizer to define intensity for each pixel are used to select one of the 16 levels.

Since the video digitizer is capable of producing eight bits of information, 256 levels of intensity are possible starting with "black" at level 1 and "white" at level 256. However, by using the four most significant bits, the 16 user selectable levels span the range from level 32 (nearly "black") to level 256 ("white").

The enhancement of contrast in the contrast selector is accomplished essentially by eliminating all intermediate intensity levels in the final image. When the user selects one of the 16 intensity levels in the 32 to 256 range, any pixel that has an intensity less than the selected intensity level is converted to intensity 1 and is effectively "black". If the intensity level of the pixel is equal to or greater than the selected level, the intensity level is converted to maximum intensity and is effectively "white".

This intensity data manipulation creates totally "black" and "white" images without any gray gradient. A gray gradient normally occurs at the edge of a magnified character when text is displayed in a conventional system. The effect of this data manipulation for people with impaired vision is two fold; first, the contrast between the text and background is maximized and second, because all gray transitions in the image are effectively eliminated, the delineation of the characters and therefore their readability is substantially improved.

In addition to the increased contrast, when the video data is processed, the scan rate is essentially doubled to supply a high resolution display with the required frequency and format voltages. The display in the preferred embodiment is a high resolution flat panel display which is very light weight. Many other displays are possible alternatives or improvements. While this image enhanced device can be used to display images on standard scan rate displays, doubling of the scan rate and the utilization of high resolution VGA type displays further improve the readability of the enhanced images. In addition, even higher scan rates may be produced if desirable using the present invention.

In addition to the monochrome application described above, color video images can also be enhanced and modified by using three digitizers and contrast selectors, one for each of the red, green and blue signals generated when a color image is digitized. In this type of application, the colors in the image can be changed to improve recognition by individuals who are color blind in addition to enhancing contrast and resolution.

Furthermore, when using a "black" and "white" (monochrome) display, it is desirable to enhance complex images such as photographs to permit the user with impaired vision to select and enhance one or more "gray" scales in the image. This can be accomplished by breaking the image into discrete "gray" shades in addition to "black" and "white". The "gray" shades in the input image would be divided into ranges for comparison in the contrast selector.

The present invention contemplates providing multiple levels of intensity, up to 256 are possible when using an eight bit digitizer, and allowing the user to select not only "black" and "white" (i.e. zero and maximum intensity) but also several intermediate "gray" levels. The intermediate "gray" levels which would be shown on the output display are selected so that all "gray" intensities within each range are displayed as a single "gray" shade. The resulting image will have "black", "white" and several discrete "gray" intensity levels. While this image will not contain as much detail as the input image, the increase in contrast between the discrete "gray" will render a complex image more discernible to a viewer with impaired vision.

In both the color systems and the systems providing intermediate gray levels, there are very large numbers of possible combinations which can be adjusted to change the contrast, spatial frequency, color and other aspects of the resulting image. However, visual impairments fall into discrete areas in many cases. In order to minimize the utility of a color or gray scale system, it is contemplated that certain variables would be pre-selected and essentially pre-programmed into the invention for a specific user based on the results of a clinical evaluation of that particular individual's visual disability. Essentially, a prescription based on the individual's visual impairment could be programmed into the invention in particular in the contrast selector, color selection, gray scale selection, magnification and/or spatial filter selection.

For example, individuals with Protanamolous or Deutanamolous color blindness dealing with difficulties in discriminating between reds and greens, depending upon the specific aspects of their impairment would have appropriate color intensification and/or shifting to permit the specific individual to obtain the maximum benefit from the use of a particular pre-programmed device. Tritanamolous color blindness, blue-yellow deficits, can also be alleviated by shifting the color of the original image to permit color discrimination.

Certain individuals with impaired vision are unable to view television or complex images such as photographs because their ability to discriminate between relatively similar shades of gray or between similar shades of various colors is impaired. At the present time, clinicians are capable of measuring the specific deficiencies in individuals with impaired vision, however, there is no ready treatment or device available to alleviate their visual impairment.

The present invention would permit the clinician after determining the specific type of impairment, to program the gray scale contrast selector for instance to break images into discrete gray shades sufficiently different to permit the viewer with an impairment to discriminate between the shades. While the image that would be produced would contain less detail than the original image when viewed by a person without impaired vision, the person with impaired vision would see significantly more detail than in the unenhanced image.

Accordingly, the addition of fourteen gray shades in addition to black and white benefit a substantial number of people with diminished capacity to discriminate among gray shades. The use of a total of sixteen different levels of gray shades including black and white is preferred although more or less may be desirable in certain cases.

In addition to the color and gray scale enhancement, it is also within the system of the present invention to provide selective modification of contrast to various portions of a complex image associated with the spatial frequency of the detail in the specific portion of the image. This is accomplished by using the digital spatial filter in the following manner.

For those individuals who have a loss of visual acuity in portions of an image with fine detail the contrast in these portions of the image can be increased to highlight the differences in the details by brightening the edges of the details in the image. While this may detract from the image for a person with normal sight, it will permit a person with impaired vision to discriminate among the objects in this portion of the image and be visible.

This same approach can be selectively applied to portions of the image which are difficult for a person with low spatial frequency loss and in that the edges of the larger details will be highlighted so that the individual can discriminate among the larger portions of the image. The high or low spatial frequency loss is a well documented and relatively common visual impairment and the preceding enhancement to the image will substantially improve visibility for such individuals with impaired vision.

For those individuals suffering from color blindness, the device can be configured in accordance with a prescription from the clinician or adjusted by the individual. The device is adjustable by enhancing the contrast for the color combination with which they have difficulty or individually inverting the color signal to permit ready discrimination between the otherwise indistinguishable colors. This inversion would be accomplished in the contrast selector for the individual color. A suitable color display must be used.

Although it is possible to manipulate video images digitally with a microprocessor, the system of the present invention enables these manipulations to be fast enough to accommodate real time application because the speed is too fast for the input/output ports of all currently available microprocessors.

In the present invention, a video camera with magnification or zoom capacity is combined with the image enhancement processing in a flat display screen in a compact portable unit, or a spectacle display. The unit is designed to be placed on a flat surface and the printed material, such as a newspaper or book or other text type material, can be placed under the video camera. The display can be disposed in an adjustable position for easy viewing by the operator. The text material can be inserted under the camera and the position adjusted to the start of the text material and the magnification and contrast adjusted to permit the text to be read comfortably by the person with impaired vision. The text material is then moved manually by the operator to display the material immediately upon the screen in the enhanced form. The text is continually repositioned in essentially the same pattern that it would be read in if scanned by a person without impaired vision who was scanning through the material to read it. Portions can obviously be reread merely by moving the text to a prior position purely at the discretion of the operator. In addition to this method of reading material, it is also possible to record the enhanced image of the text on a video tape or other device so that it could be replayed by the operator or another party at a future time. In the spectacle version of this invention, the camera can be mounted to the spectacle.

Video signals are 1 volt peak to peak. They are filtered and amplified before being input to the A/D converter. The video signals are digitized and held by a series of latches which samples and holds each pixel. An 8 bit gray scale is produced which creates 256 levels of contrast.

A precise reference voltage must be established to set the limits of the comparator. Both +12 to +15 volts and −12 to −15 volts are input to the A/D converter for this application. A sync signal separator is used to retrieve the horizontal and vertical sync signals from the composite video. The pixel clock is determined by locking an oscillator of a known multiple to the sync signal.

Finally the 8 bit gray scale, horizontal and vertical sync signals and the pixel clock are output.

This video digitizer can be used with NTSC standard video or any video device. It can be produced as a separate circuit or is available as a hybrid integrator circuit from Analog Devices.

Once the image is digitized it can be put through high pass, low pass or band pass filters to change the spatial frequency of the image being viewed. By using programmable Eproms or EEproms the contrast levels can be reassigned. Eproms can also be used to enhance the contrast for selected spatial frequencies. Printed matter is illuminated by an internal light source. A video image is formed by an autofocus autoiris lens and the video image is directed to the analog to digital converter.

In addition to digitizing the analog video signal, an integral sync signal separator separates the incoming horizontal and vertical clocks. The clock generator produces the output vertical sync clock, the horizontal sync clock, and output pixel clock, and all other clocks. The digitized image passes through a contrast selector before it is read into a frame memory. The frame memory functions by holding an entire screen image in each page. For example, while one page is receiving the odd lines followed by the even lines, the other page is being read out to the display. The entire page being outputted to the display is read twice before the next read in of data for the next page.

The timing signals from the input horizontal and vertical counters and output horizontal and vertical counters to appropriate page of memory is controlled by two sets of multiplexors. The video image is stored on alternate lines so that odd and even lines of the standard video image can be reformed.

Finally, each line of the image is read out of memory. The digitized signal output is adjusted to meet the requirements of the display. The clock generator takes the sync signal from the video signal and the output of the top of page detector and sends new horizontal and vertical sync signals to the screen.

A pixel clock can be derived from a multiple of the video pixel clock using a programmable flip flop or by synchronizing the new pixel clock to the old by using a phase locked loop to prevent drifting.

The present invention is incorporated into a spectacle mounted display and used in conjunction with the digitally enhanced imager. The visual information of the various spatial frequencies can be selectively enhanced and projected into a person's eye to compensate for any visual impairment or impaired vision.

Accordingly, it is an object of the present invention to include a compact portable means for capturing, enhancing and projecting images primarily of text type material to improve readability by individuals with impaired vision.

It is another object of the present invention to enhance the contrast of video images by digitizing a conventional analog video signal and increasing the contrast between the test and background areas using digital technology.

It is another object of the present invention to improve visibility of video images by eliminating the "gray" transition between the characters and the background in text type material.

It is a further object of this invention to improve the resolution of video images by increasing the scan rate to double the normal video image scan rate.

It is a further object of the invention to generate video images with enhanced contrast and resolution and also scaleable or magnified images of text for purposes of displaying them on video monitors, recording such images on tape devices, disk devices, floppy disks or other types of electronic storage media for the purposes of redisplay in the enhanced format, or to print these enhanced images with high resolution printers.

It is the further object of this invention to provide a person with a compact portable device which can be used to scan text material, process the images produced by the camera, improve contrast and resolution and to display those enhanced video images in real time on a lightweight, compact, high resolution monitor such as a flat, portable display. This permits a person with impaired vision to take the vision enhancement device and use it to read text materials that would otherwise be unavailable.

It is a further object of this invention to provide a method for displaying the standard Monochrome RS-170, NTSC or European PAL video signals on high resolution monochrome or color monitors.

It is a further object of this invention to provide for a method of improving recognition of color images by individuals who are color blind by manipulating the color distribution of video images.

It is a further object of this invention to provide a means for increasing the spacing between characters in text for display.

It is a further object of this invention to provide a spectacle mounted camera or goggle type video display incorporating the invention to enhance an individual's ability to see.

It is a further object of this invention to enhance video images to overcome a threshold intensity that effects certain individuals with impaired vision.

It is a further object of this invention to provide for multiple intensity levels, this is, to include "black", "white" and "gray" monochrome images and permit the selection of one or more "gray" shades for viewing images such as black and white photographs which would otherwise be difficult or impossible for a person with impaired vision to see.

It is a further object of this invention to provide an image contrast enhancement device with as many as two hundred and fifty-six (256) discrete levels of intensity.

It is a further object of this invention to permit individuals who are color blind to make use of color codes such as those on electrical components by using a color version of this invention.

It is a further object of this invention to improve color recognition for individuals affected with Protanamolous, Deutanamolous or Tritanamolous color blindness.

It is a further object of this invention to enhance contrast and resolution of images for direct display on displays without the use of any memory to store digital video image data such as a Finlux display.

It is a further object of this invention to permit an instructor to display text type material to a group of individuals with impaired vision using a single scanning device such as a camera, a single image enhancement device, and then distribute that enhanced video signal in real time to monitors located in front of each person to permit them to simultaneously view the material in enhanced form as indicated by the person offering the instruction.

It is also an object of this invention to permit the enhancement and display of standard television video images by enhancing the output from, for example a VCR, in real time and after enhancement reconverting the video image to a standard analog signal and displaying the enhanced imaged on a standard television set.

A further object of the invention is to incorporate the system into a spectacle mounted display for use by individuals with impaired vision.

Another object of the invention is to present enhanced video images to an eye to compensate for the eye's inability to see contrast, detail or color.

An additional object is to include means to view video images in 2 or 3 dimensions by creating a virtual image of a display in space by using a spectacle imager.

An advantage of the invention is to include a digital image enhancing device comprised of a contrast selector in which the intensity level associated with each pixel in a video image is compared to a user selected setting and an output from the contrast select is converted to either maximum or minimum intensity depending upon the relationship between the input and the comparator level to maximize the contrast in the output video image.

Another advantage is to include a digital image enhancing device comprised of a programmed logic device which is programmed to reassign the intensity level associated with each pixel in the output video image based on the contrast sensitivity needs of a specific individual.

An additional advantage of the invention is that the input data intensity level is represented by an 8 bit binary code and the comparator or programmed logic device utilizes one or more binary data bits to determine contrast in the output video image.

Another advantage of the invention is that the color video image has an intensity level of one or more of the three digitized color signals, each of which is compared to a user selected level for each pixel of that color in the video image and the output from the contrast selection device, is converted to either maximum intensity or minimum intensity depending upon the relationship between the input and the selected comparator level.

A further advantage of the invention is to include as part of the spectacle digital image enhancing device a programmable logic device, which is programmed to reassign the intensity level associated with each pixel in the output video image based on the contrast sensitivity of an individual.

An advantage of the invention is the use of the contrast selection device, in which at least 2 intensity levels are selected, thereby producing at least three output intensities including black, white and at least one gray shade.

An object of the invention is to include a band pass filter to selectively enhance the contrast of high spatial frequency details in the image.

Another object of the invention is to have a device capable of enhancing the contrast of low spatial frequency details in the image.

A further advantage of the invention is to have a device in which contrast of midrange spatial frequency details in the image are enhanced.

An additional advantage of the invention is that the contrast of low, midrange and high spatial frequency details in the image are enhanced.

It is an object of the invention to include a device in which video pixel intensity described by an 8 bit binary code, can be represented by black, white and 14 gray shades by using fifteen 8 bit comparators, fifteen 8 bit binary switches and one encoder with fifteen inputs and four outputs.

It is an advantage of the invention that one or more comparators produce black, white and one or more gray shades.

A further advantage of the invention is a band pass filter to selectively enhance the contrast of high spatial frequency details in the image.

An additional object of the invention is that the device is capable of enhancing the contrast of low spatial frequency details in the image.

A further advantage of the invention is that the contrast of midrange spatial frequency details in the image are enhanced.

An advantage of the invention is that the contrast of low, midrange or high spatial frequency details in the image are enhanced.

It is an advantage of the invention to take selected low, midrange or high spatial frequency information and multiply it by the original image data and then add this information back to the original image.

An additional advantage is that the video pixel intensity for each color, red, green and blue described by an 8 bit binary code can be represented by 16 shades of each color using forty five 8 bit comparators, forty five 8 bit binary switches and three encoders with fifteen inputs and four outputs.

It is an object of the invention to include two or more comparators on each digitized color signal to produce maximum intensity, minimum intensity and one or more intermediate shades.

Another advantage of the invention is that the digital image enhancing device comprises a video signal digitizer, sync signal separator, contrast selector, clock generator, output horizontal counter, output vertical counter, whereby an analog video signal from a conventional video source is digitized in the video digitizer and wherein the digitizer video image is processed in the contrast selector whereby the user of the digitized imager selects the contrast level between pertinent features of the video image and the background so that the image will be displayed in black and white without gray shades.

An additional object of the invention is to include projector optics for imaging video data on the retina of the eye.

It is an advantage of the invention to include a mirrored projector system which images video data on the retina by a mirror.

An additional advantage of the invention is that a fiber optic bundle image rectifier compensates for the distortion produced by imaging video data in the eye by conventional optics.

Another advantage of the invention is to include a digital bit remapper to rectify and compensate for the distortion produced by imaging video data in the eye by conventional optics.

Another advantage of the invention is to include a digital bit remapper to rectify and compensate for the distortions or loss of visual field produced by low vision.

Another object is that the mirrored system utilizes a concave mirror to produce a virtual image of a video display.

An additional advantage is that the spectacle comprises a micro display, projector optics, a mirror and a series of multipliers to combined video images with enhanced data and sync signals.

An additional advantage of this invention is to utilize a video DAC (Digital Analog Converter) and a series of multiplexors to recombine horizontal and vertical sync signals for forming a composite video signal.

Further objects and advantages of the invention will become apparent from a consideration of the drawings and ensuing description of it.

BRIEF DESCRIPTION OF THE DRAWINGS

FIG. 1 is a schematic of the Digitally Enhanced Imager made in accordance with the present invention.

FIG. 2 is a schematic of the video digitizer made in accordance with the invention.

FIG. 5 is a schematic of the clock generator made in accordance with the present invention.

FIG. 11 illustrates the digitally enhanced imager system in a block diagram with an optical system in accordance with the present invention.

FIG. 12 illustrates an unfolded optical path display in accordance with present invention.

FIG. 13 shows a reflector version with a mirrored spectacle in accordance with present invention.

FIGS. 14A, 14B, 14C show a digitally enhanced imager system utilizing adjustable mirrors and prisms in a spectacle mounted display as set forth in the present invention.

BRIEF DESCRIPTION OF THE INVENTION

Figure 3A:
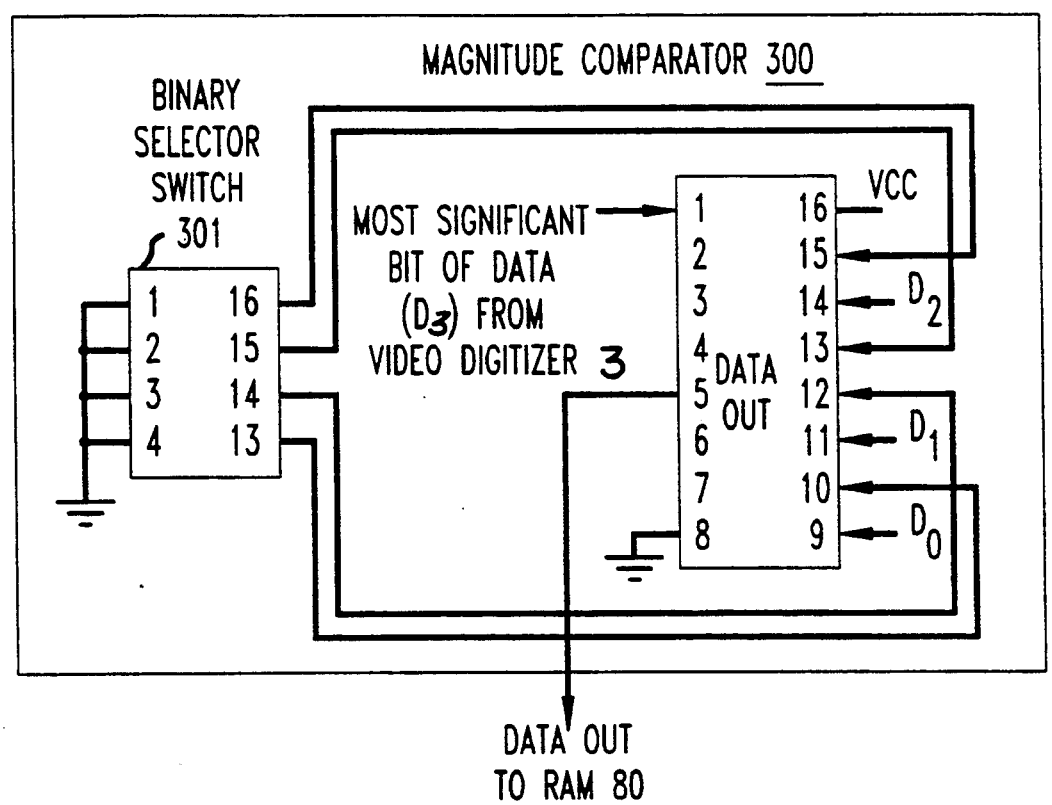
FIG. 3A is a schematic of the contrast selector of the present invention.

Referring to FIG. 1, a schematic of the digitally enhanced video imager made in accordance with this invention is shown.

Printed matter is illuminated by internal light source 102. A video image is formed by autofocus autoiris zoom lens 104 and video image 103 is directed to an analog to digital converter or video digitizer 3. More particularly, camera 1 captures an image of a portion or all of text material 2 and transmits analog video signal 103 to video digitizer 3 in which the signal is converted from analog to digital form and transmitted in part to sync signal separator 4 through output 104. The data portion digitizer video signal 5 is transmitted to contrast selector 6 which is used to enhance the contrast of the video image. Enhanced digitized video data 80 are sent to either high speed memory page 7A or 7B.

The signal transmitted to sync signal separator 4 is divided into input pixel clock signal 8, input horizontal sync signal 9 and input vertical sync signal 10. These three signals are transmitted to clock generator 11 which generates output pixel clock 20, output horizontal sync 21 and output vertical sync 22. Image scaling circuit 333 receives these inputs and sends output 31 directed to output horizontal counter 40, output 32 directed to output vertical counter 41. Top of page detector 50 sends output 34 to vertical counter 41.

The outputs from signal separator 4, in addition to being transmitted to clock generator 11, are also transmitted to input horizontal counter 60, and input vertical counter 61 as follows; pixel clock signal 8, and horizontal sync signal 9 are transmitted to input horizontal counter 60.

Vertical sync signal 10 and horizontal sync signal 9 are transmitted to input vertical counter 61. Output 121 from input horizontal counter 60 and output 122 from input vertical counter 61 are directed to multiplexors 70 and 71 along with output 125 from output horizontal counter 40 and output 126 from output vertical counter 41.

Multiplexors 70 and 71 direct the appropriate input and output addressable location to RAM Page 7B and 7A which are both 256K×1 in the preferred embodiment. While input data 80 is being read into a RAM Page 7B, output data 84 is being transmitted from RAM Page 7A to multiplexor 72. When the transfer of output data 84 to multiplexor 72 is complete, output 83 is transmitted from RAM Page 7B to multiplexor 72. While this is occurring, input data 80 is directed to RAM Page 7A.

Multiplexors 70 and 71 keep track of the input and output addressable locations by receiving the appropriate output horizontal locations 125 and output vertical location 126. While RAM 7B is outputting RAM 7A receives input addresses 82 from input horizontal locations 121 and input vertical locations 122, RAM 7B is receiving output addresses 81 from horizontal locations 125 and vertical locations 126. Multiplexor 72 alternately transmits the output 84 from RAM 7A and the output 83 from RAM 7B. Multiplexor 72 switches when it receives a top of page signal 34A. The output of multiplexor 72, data signal 85 goes to inverse video selector 200 which sends data signal 86 to display 30 where it is combined with data clock 20, vertical sync signal 22, and horizontal sync signal 21 to produce an appropriate image on display 30. Input data 80 is stored on alternate lines in RAM 7A or RAM 7B. After one field is input the second fills the unused address lines. Both the odd and even lines of a standard video image form a complete video image in each RAM page. This is produced by the input vertical counter 61.

In addition to a direct transmission of output 85 from multiplexor 72 to display 30, output 85 can be processed by a standard invertor to produce a negative image. Inverse image selector 200 is comprised of an invertor and a selector switch. The output 86 from the inverse video selector 200 can produce positive or negative images, white on black or black on white.

In addition, output 86 when combined with data clock 20 horizontal sync 21 and vertical sync 22 in digital to analog converter 201, can be converted to a standard video signal 87 encompassing the enhanced image provided by this invention. This standard video signal can be recorded on video cassette recorder 202 or displayed on a standard television.

In addition, image scaling can be accomplished by changing output 20, output 21 and output 22 from clock generator 11. The image scaling circuit 333 changes the outputs from the appropriate output counters as indicated above. Image scaling circuit 333 is a conventional image scaling device which can increase and/or decrease the horizontal and/or vertical size of the ultimate image by changing the horizontal and vertical output counters 40 and 41 to accomplish image scaling, aspect ratio modification or change character separation.

FIG. 2 is a schematic of conventional video digitizer 3 and sync separator 4 which includes stable reference voltage sources 100A and 100B for the analog to digital converter 101 and includes conventional circuitry 110 in which video input 103 is amplified, the scan synchronization signal is separated into pixel clock signal 8, horizontal sync signal 9 and vertical sync signal 10 and digitized video data 5 (at eight bits per pixel representing intensity) is outputted from analog to digital converter 101. Phase locked loop 105 comprised of Divide by N circuit 106, phase detector 107, loop filter 108, and VCO 109, keeps pixel clock 8 synchronized with video input 103.

Figure 3B:
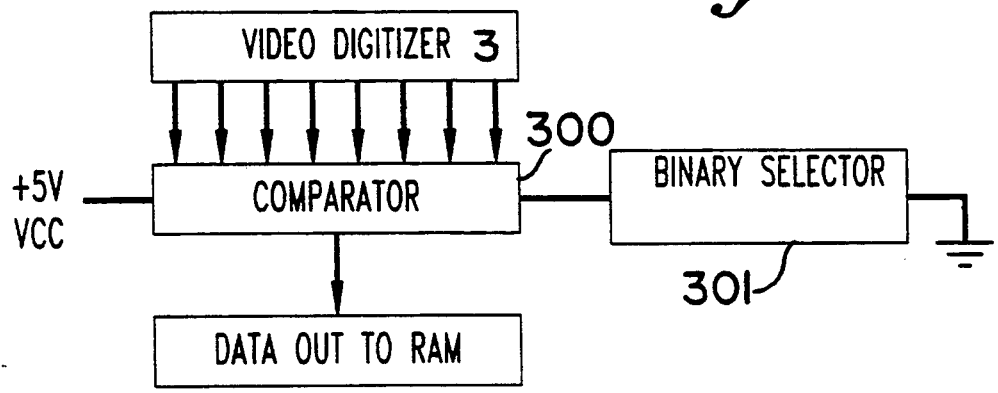
FIG. 3B is a block diagram of the contrast selector and other connecting elements.

In FIGS. 3A and 3B, the four most significant bits (D0, D1, D2 and D3) of digitized video data 5 are input to magnitude comparator 300. Binary selector switch 301 which can select one of 16 levels of intensity is used to set the intensity level in comparator 300. In comparator 300, the intensity level for each pixel (represented by D01, D1, D2 and D3) is compared to the level set by selector switch 301. If the intensity level of the pixel is greater than the level set by selector switch 301, the maximum intensity ("white") is assigned to that pixel. If the intensity level of the pixel is less than the set level, the minimum intensity ("black") is assigned to the pixel. From magnitude comparator 300 output data 80 are read into memory page 7A or 7B. Programmable logic devices such as an Eprom or programmable EEprom can be used in place of selector switch 301 and magnitude comparator 300 to generate appropriate output pixel intensity levels.

Figure 4A:
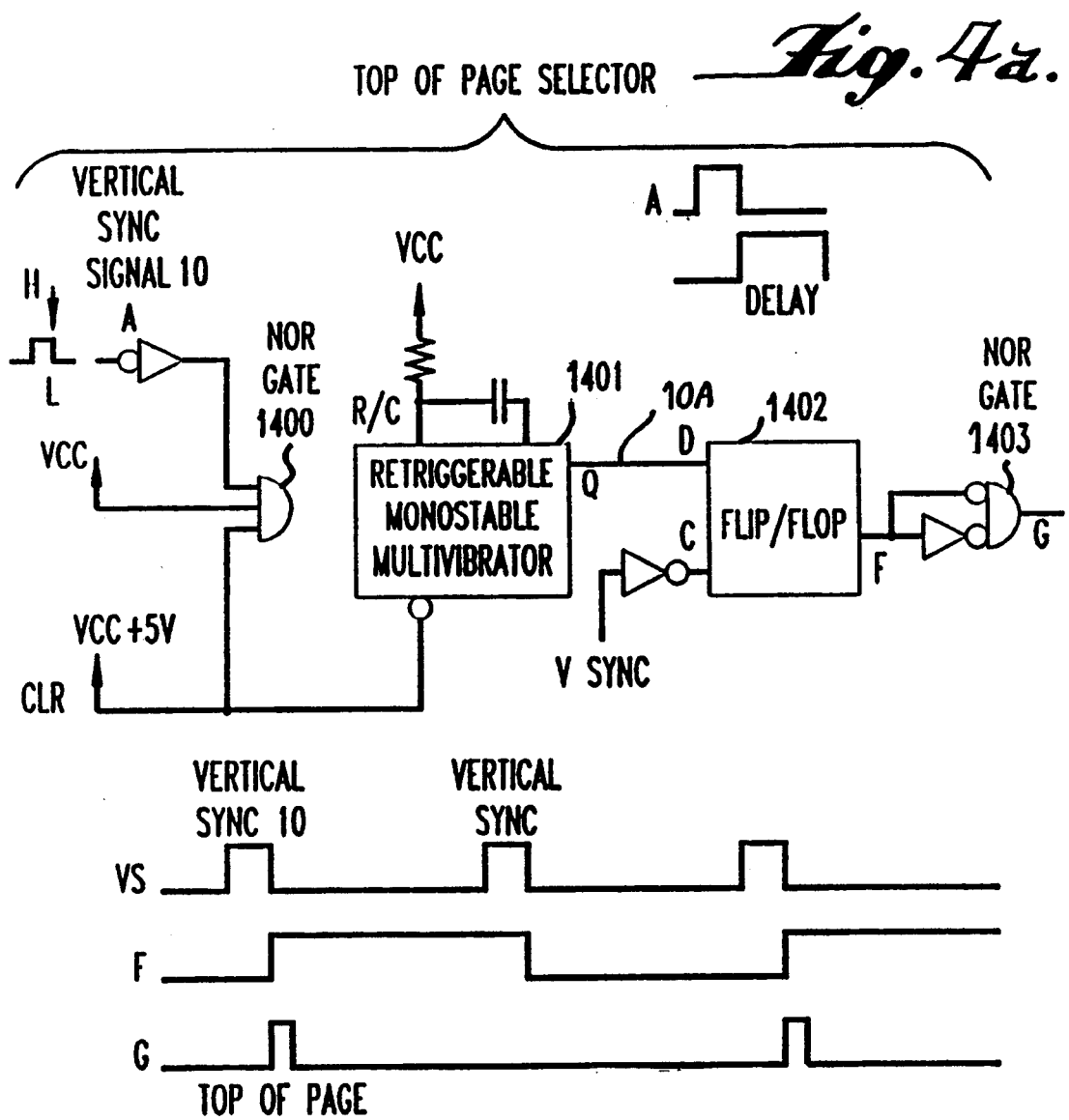
FIG. 4A shows a schematic of the top of page detector.

In FIG. 4A, vertical sync signal 10 from sync signal separator 4 is input through nor gate 1400, retriggerable monostable multivibrator 1401, flip/flop 1402 and nor gate 1403. Nor gate 1400 and retriggerable monostable multivibrator 1401 produce new vertical sync pulse 10A. Vertical sync pulse 10A is of sufficient width so that when trailing edge 10 of vertical sync pulse 10A (high to low transition) is coincident with rising edge 10A or 30 Hz square wave F (low to high transition), which occurs after every two frames, nor gate 1403 produces 30 HZ top of page pulse G and output in top of page signal 33.

Figure 4B:
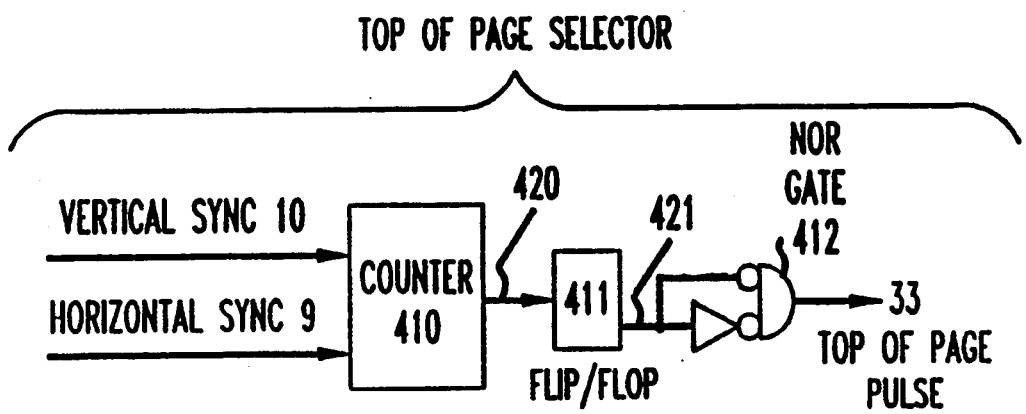
FIG. 4B shows a schematic of an alternative embodiment of the top of page detector.

In FIG. 4B, an alternative method of generating top of page pulses utilizes a synchronous counter for vertical sync output. Input horizontal sync signal 9 is combined with input vertical sync signal 10 in counter 410. Counter output 420 is only high when both sync pulses are present indicating the first field. Output 420 is put through positive edge triggered flip flop 411 which produces 30 Hz square wave 421 in the preferred embodiment. Output 421 is put through nor gate 412 to produce top of page pulse 33.

FIG. 5 illustrates the preferred embodiment of clock generator 11 which is comprised of programmable flip flop 400 delay 401 and invertor 402. Input data pixel clock 8 is inverted in invertor 402 and output 8A is input along the data pixel clock 8 to programmable flip flop 400. The output 20B from programmable flip flop 400 is processed through delay of 401 which is 100 nanoseconds and the output from delay 401 is combined with output 20B to produce screen pixel clock signal 20 which is double the input data pixel clock frequency. Output horizontal sync signal 21 is generated by processing input horizontal sync signal 9 through nor gate 404 and counter 403 in which output screen pixel clock 20 provides the clock signal for counter 403 to produce output horizontal sync signal 21. Output vertical sync signal 22 is generated by processing input vertical sync signal 10 through invertor 406 and inputting the inverted signal into counter 405 along with output horizontal sync signal 21 to generate output vertical sync signal 22. While the clock rates are approximately double the input rates, clock rates equal to the input rates or other multiples of the input rates can also be implemented to accommodate scan rate requirements of any output device.

Figure 6:
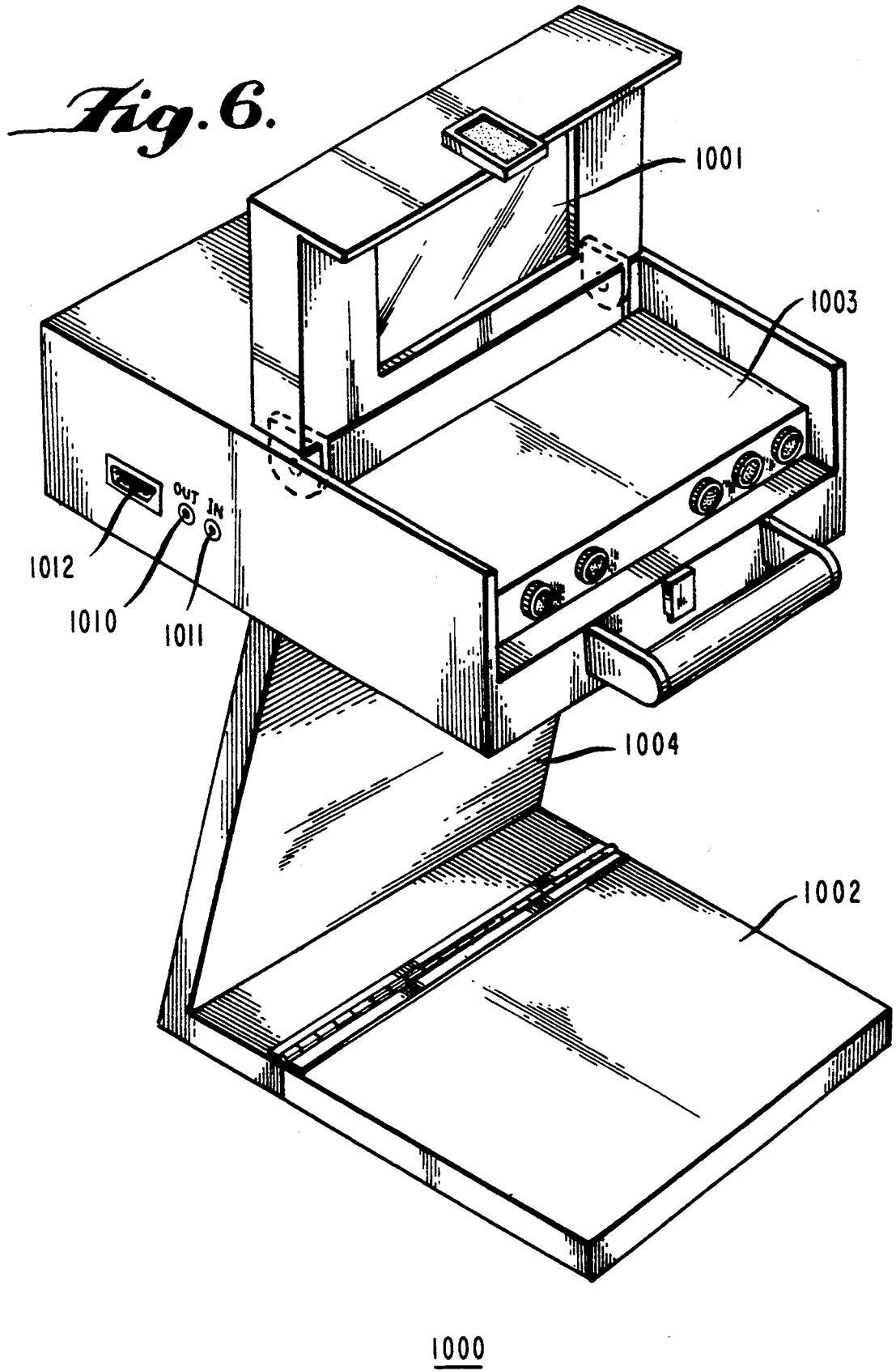
FIG. 6 is a drawing depicting the panel display and the device disposed for use in accordance with the invention.

FIG. 6 depicts the digital enhanced video imaging device 1000 with flat display 1001 shown in the open position above body 1003 which is positioned above display plate 1002 by support 1004. This device 1000 includes the circuitry as illustrated and discussed with reference to FIGS. 1-5 and is shown here as one embodiment. Serial port 1012 deposed on the side of the unit and in addition input jack 1011 which is designed to accept the standard video signal input for the instrument on display and output jack 1010 which is designed to allow the user to record on a standard VCR enhanced image outputs are also deposed on the side of body or case 1003.

Figure 7:
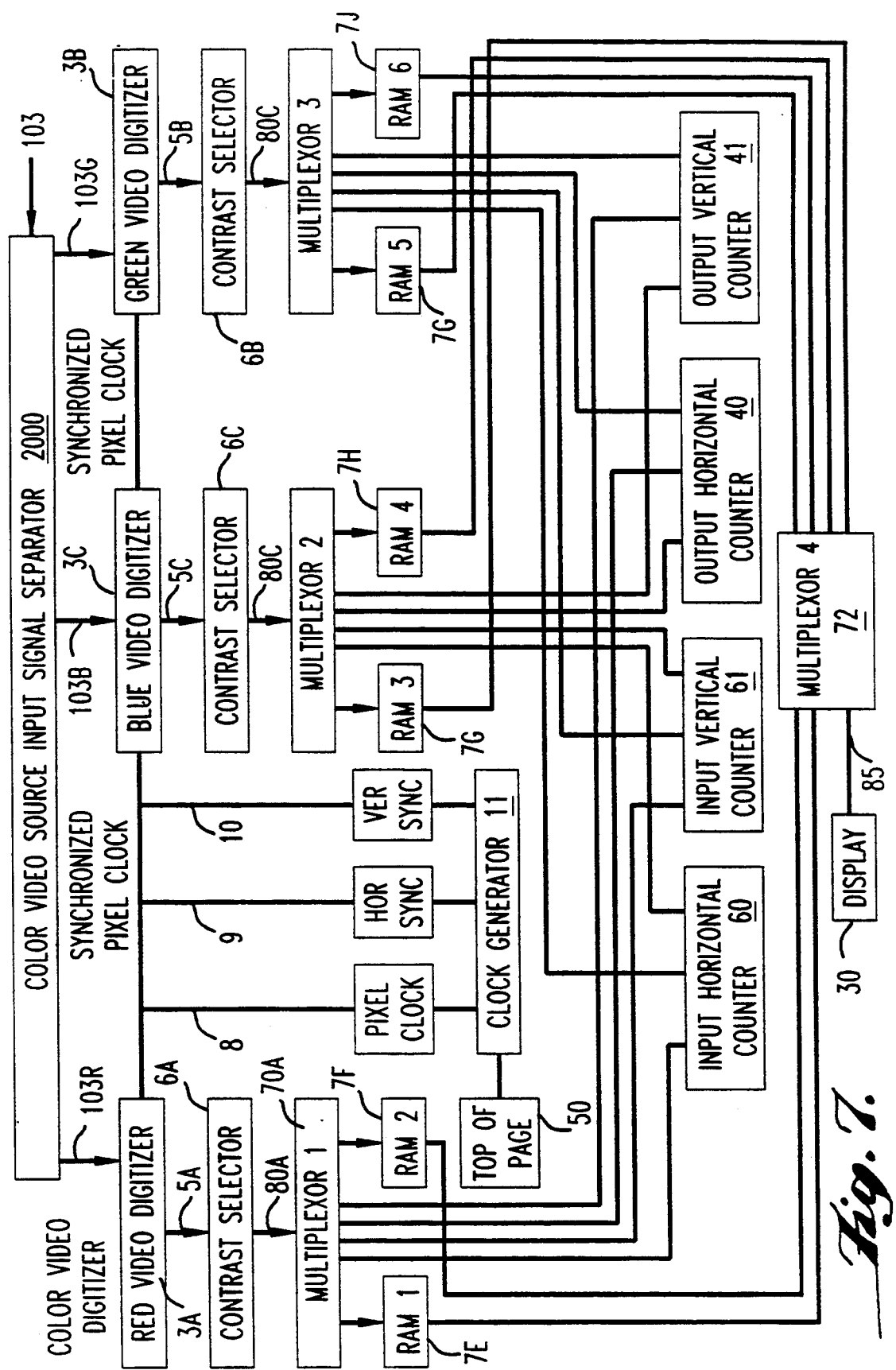
FIG. 7 depicts the use of three digitizers and three contrast selectors for red, green and blue data to produce enhanced or modified colored images.

FIG. 7 illustrates the present invention in a color video environment. In FIG. 7, color video signal 103 is processed in the color video source of signal separator 2000 into pixel clock signal 8, horizontal sync signal line 9, vertical sync signal 10 and into three video signals. The first is red video signal 103R, the second is green video signal 103G and the third is blue video signal 103B. Each of the analog signals is digitized by each of the three video digitizers, red video digitizer 3A, green video digitizer 3B, and blue video digitizer 3C. Digitized output data from each digitizer namely red video data 5A, green video data 5B and blue video data 5C are transmitted to respective contrast selectors 6A, 6B and 6C. Contrast selectors 6A, 6B and 6C can be used to create maximum and minimum intensity for each color or maximum and minimum intensity with intermediate shades may also be selected for each color. Programmable logic devices such as an Eprom or programmable EEprom can be used in place of contrast selectors 6A, 6B and 6C to generate appropriate output pixel intensity levels. Output data 80A, 80B, and 80C from their respective contrast selectors are processed in multiplexors 70A, 70B and 70C and then transmitted alternatively to one of two pages of memory for each multiplexor. In the preferred embodiment, each page of memory namely Pages 7E, 7F for multiplexors 70A are 256K by 8 bit memory. Memory Pages 7G and 7H serve multiplexors 70C and memory Pages 7I and 7J serve multiplexor 70C. Pixel clock signal 8, horizontal sync signal 9 and vertical sync signal 10 which in the preferred embodiment are those associated with green video signal 103G are processed in clock generator 11 and top of page detector 50. Clock generator 11 as previously described produces in FIG. 5 signals for pixel clock, horizonal sync and vertical sync which are combined with output multiplexor 72 with video data signal 85 from output multiplexor 72 in display 30 to produce an enhanced color video image.

Input horizontal counter 60 and input vertical counter 61 process input pixel clock 8 and horizontal sync signal 9 and vertical sync signal 10 as described previously and output appropriate addresses to multiplexor 70A, 70B, and 70C. In addition, clock generator 11 output signals for pixel clock, horizontal sync and vertical sync are transmitted to output horizontal counter 40 and output vertical counter 41. Output horizontal counter 40 and output vertical counter 41 process the signals and appropriate output is transmitted to multiplexor 70A, 70B, and 70C as described above. Alternate pages of memory for each color from RAM Pages 7E and 7F, 7G and 7H and 7I and 7J are transmitted in an appropriate format to output multiplexor 72. It is also contemplated that image scaling circuitry as described in FIG. 1 may also be utilized in this embodiment to change the aspect ratio, size or spacing between characters enhanced color video image.

Figure 8:
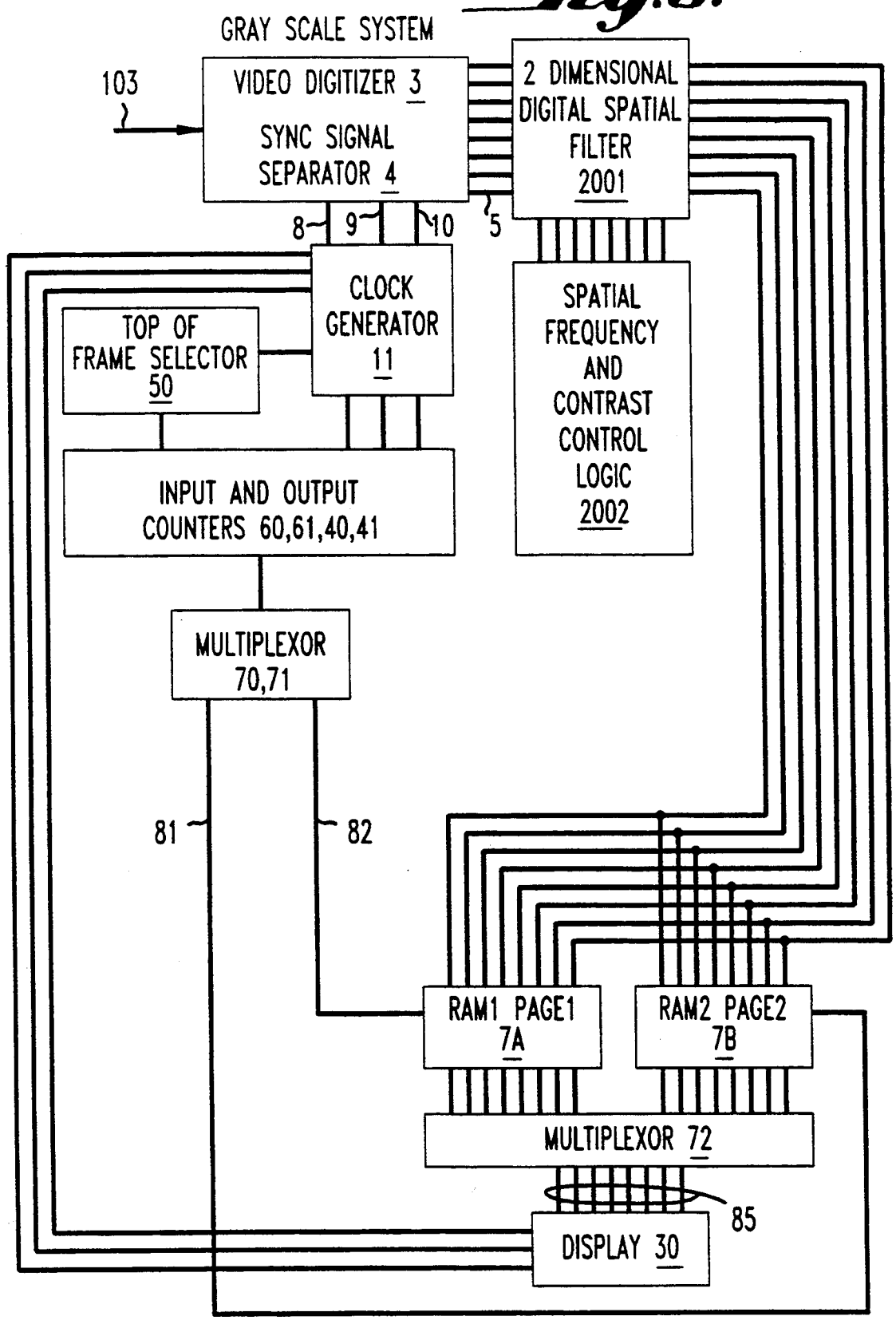
FIG. 8 depicts a digital spatial filter and contrast control logic device to increase the contrast of selected ranges of spatial frequencies of the features of the video image.

FIG. 8 illustrates the invention with the addition of two dimensional digital spatial filter 2001. In this embodiment, monochrome video signal 103 is processed in video digitizer 3 and sync signal separator 4 into output video data 5, pixel clock 8, horizontal sync 9 and vertical sync signals 10. Digitized video data 5 is processed by a two dimensional digital spatial filter 2001.

The spatial frequency and contrast adjustments are controlled by a programmable logic device like an Eprom or EEprom 2002. Spatial frequency, as discussed, is related to the separation between adjacent features in the video image. Transitions occur at the interface of any dark and light area in the image. As the video data is generated there will be transitions between light and dark areas embodied in the intensity differences in the video signal and in the digitized signal. The intensity level for successive pixels will vary in time as the light and dark areas of the image are scanned.

The dimensional digital spatial analyzer 2001 senses the time between successive dark to light and light to dark transitions which correspond to the spatial frequency of the features in video image. An image can be described by outlines, broad areas of color and shading. Visual information is processed in the eye in three ranges of spatial frequency. High spatial frequency (closely spaced information such as the details in the outlines of the features in the image) is sensed by the closely spaced photo receptors in the macula. Low spatial frequency (widely spaced information such as broad areas of color in the image) is sensed by peripheral retina photo receptors. And midrange spatial frequency (which corresponds to the shading in the image) is sensed by interactions of the macula and peripheral photo receptors. An individual can have a deficit in one or more of these ranges. Substantial improvements in visibility can be achieved by increasing contrast for one or more of these ranges.

Figure 9:
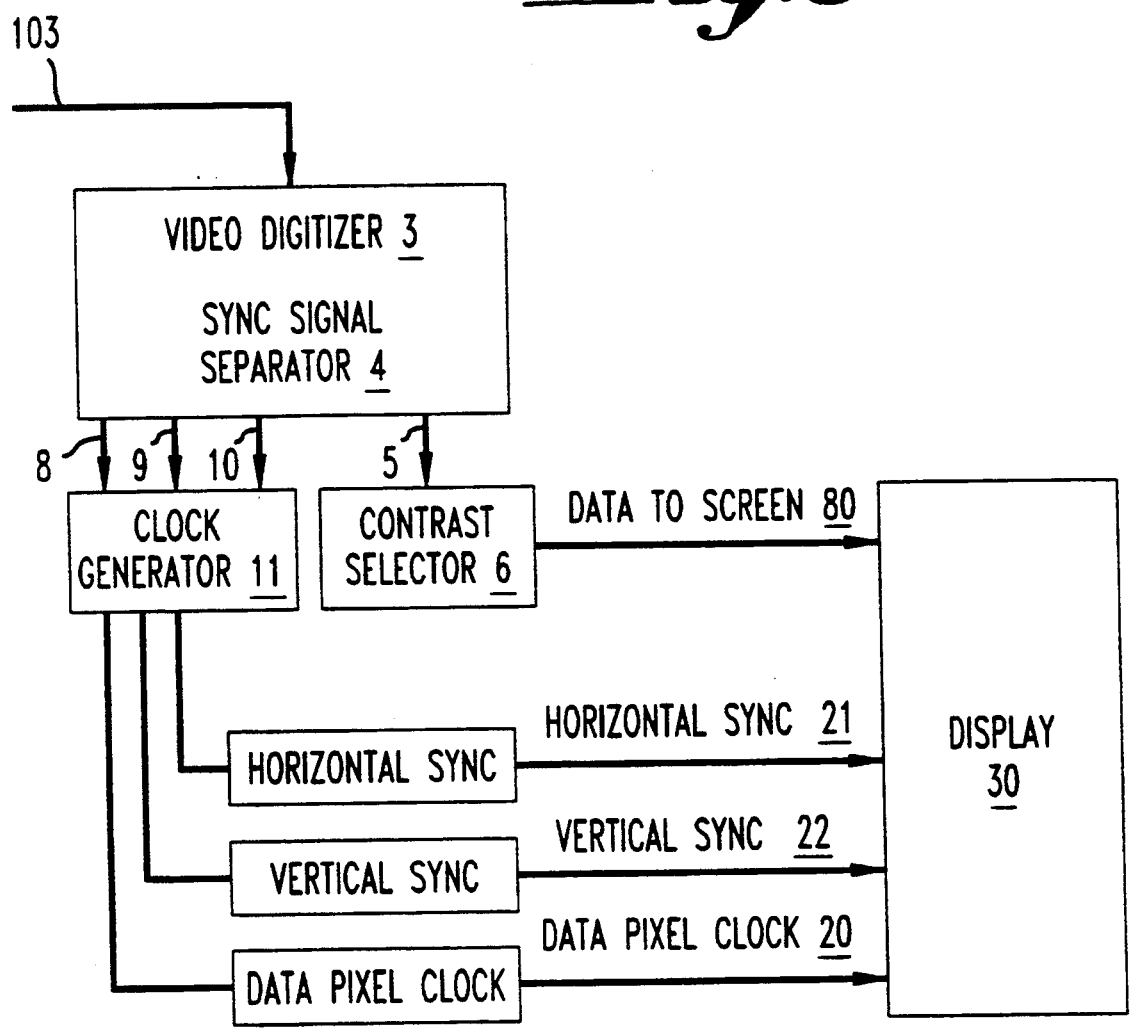
FIG. 9 depicts a schematic for an alternate embodiment using a screen dependent device which does not require the use of digital video image memory.

FIG. 9 illustrates an embodiment which is comprised of video digitizer 3, sync signal separator 4, clock generator 11 and contrast selector 6 in which input video signal 103 is digitized and enhanced and output data 80, horizonal sync signal 21, vertical sync signal 22 and data pixel clock signal 20 are output directly to display 30.

Figure 10:
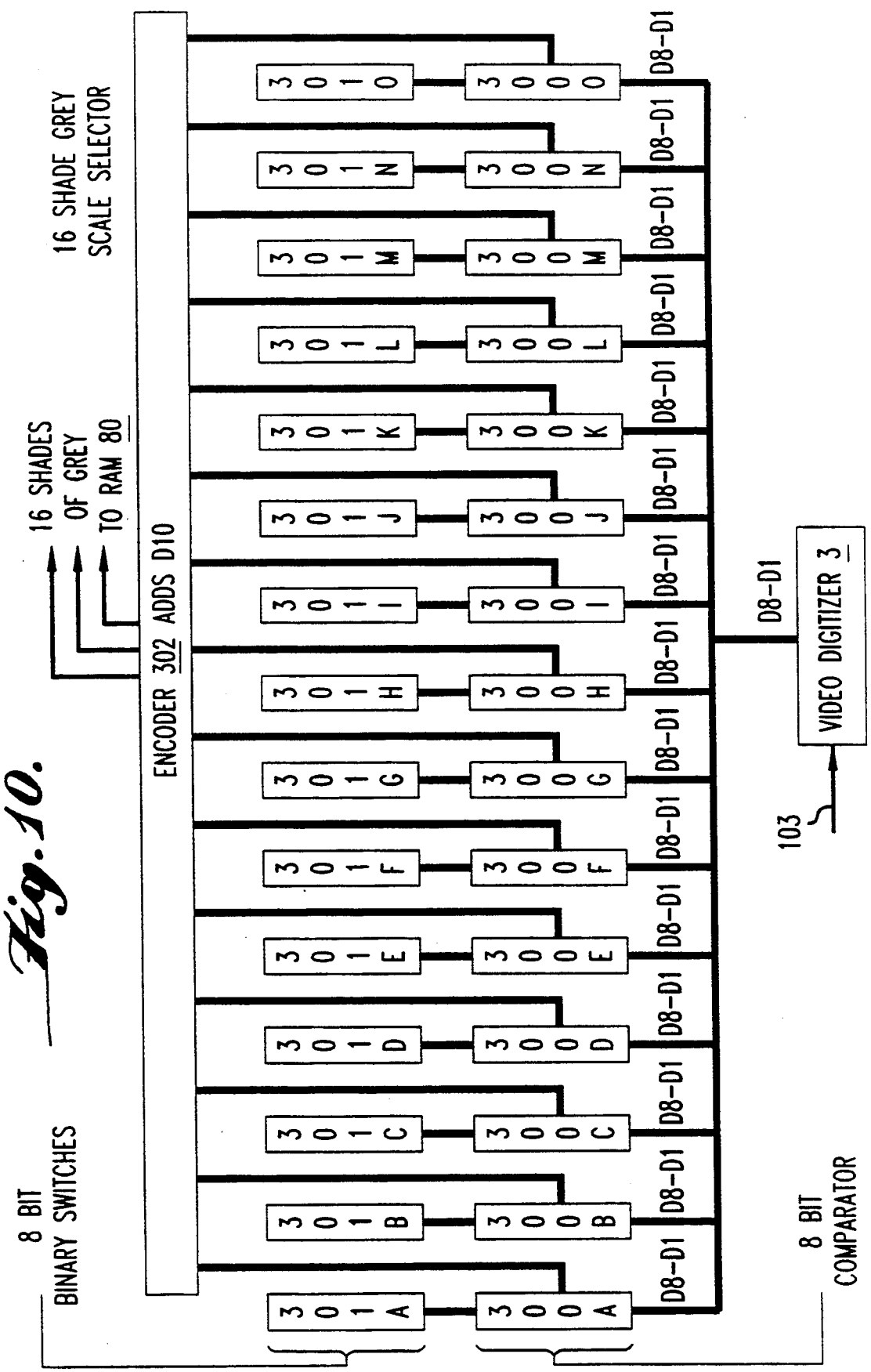
FIG. 10 depicts a schematic for a "gray" scale contrast selector which produces "black", "white" and fourteen "gray" shades using fifteen 8 bit comparators, fifteen 8 bit binary switches and one 15 bit input encoder with four outputs which produces a four bit output which will create black, white and fourteen levels of gray.

FIG. 10 illustrates the use of fifteen comparators and fifteen selector switches to produce "black", "white" and fourteen shades of "gray". Each of the eight data bits (D1, D2, D3, D4, D5, D6, D7 and D8) of digitized video data is input to all of the magnitude comparators 300A, 300B, 300C, 300D, 300E, 300F, 300G, 300H, 300I, 300J, 300K, 300L, 300M, 300N, and 3000. Binary selector switches 301A, 301B, 301C, 301D, 301E, 301F, 301G, 301H, 301I, 301J, 301K, 301L, 301M, 301N, and 301O) each of which can select one of 256 levels of intensity is used to set the intensity level in their respective comparator.

In each comparator, the intensity level for each pixel (represented by eight data bits) is compared to the level set by each selector switch. If the intensity level of the pixel is equal to or greater than the level set by the selector switch, the output of the comparator is equal to 1. If the intensity level of the pixel is less than the level set by the selector switch the output is equal to 0. An encoder will add the number of comparators which have a "1" output and thus produce a bit representation of that sum. Programmable logic devices such as an Eprom or programmable EEprom can be used in place of all selector switches and magnitude comparators and encoders to generate appropriate output pixel intensity levels. These programmable logic devices function as selectable comparators just as the combination of magnitude comparators and selector switches function as contrast selectors.

Reference is now made to FIGS. 11-17 wherein the present invention is utilized with a spectacle mounted display.

Spectacle displays are of two kinds, those that project the image of the display directly into the eye and those that reflect the image of the display into the eye by using a spectacle mounted reflector. The displays can be LEDs, electroluminescent, liquid crystals, plasma and small video CRT tubes. The present invention illustrates in one embodiment, a spectacle mounted projector which uses a small video CRT mounted on the front of the frame. Lenses image the display in the eye. This device is preferred because it produces a very bright black and white image which is capable of contrast enhancement.

The reflection method uses a display behind or on the side of the user and reflects it off a spectacle reflector. One method contemplated is to use holographic optics to collimate the image and correct for the distortion produced by an off axis display.

One alternative device which corrects for distortion is a coherent fiber optic path between the display and the reflector. The fiber optic bundle produces the necessary distortion which will be cancelled by the distortion of the reflector.

Another method is a reflection method. The video images are digitized and bit mapped into a memory device and readout with the appropriate distortion to cancel out the distortion of the spectacle reflector.

Another alternative is to utilize a Festic-Elbert mount which contains a single collimating and focusing mirror. After passing through an enhanced slit, the light falls on half of the mirror where it is collimated and reflected to the plane grating. After dispersion, the light is focused by the other half into the exit slit, and the grating is rotated. The Festic-Elbert design is of simple construction and easy to adjust. Certain aberrations can be corrected for by using curved rather than straight slits.

In FIG. 11, the video camera or scanner 1 sends a video signal 103 to the video digitizer 3 with an analog to digital converter 3 and sync signal separator 4. The signal is then compared or enhanced by the contrast selector 6 or spatial frequency logic 2002. The signal then goes to a video DAC or a display processor 500 which is comprised of a digital to analog converter and a series of multiplexors or color registers to combine digitized data with sync signals and convert it back to analog if the micro display is analog or digital; if the micro display is digital the outputs from multiplexor 72 go directly to the display along with outputs from clock generator 11, to a video display 600A and 600B, to projector optics 700A and 700B, to a mirror 800A and 800B and finally imaged in to each eye.

FIG. 12 shows virtual enlarged erect image 5000 of display 600A or 600B by using projector optics 700A or 700B in an unfolded optical path without mirrors 800A or 800B in place.

FIG. 13 shows a reflector version where the image is projected onto a mirrored spectacle 3000 and then imaged in the eye. Because off axis displays 600A or 600B are distorted, the image must be magnified asymmetrically to correct this distortion. A coherent fiber optic bundle 900A or 900B produces a new image which is distorted after passing through the projector optics 700A or 700B, and reflected off mirrors 800A or 800B and reflected off the mirrored spectacle reflector 3000.

In FIG. 13, the coherent fiber optic bundle 900A and 900B can be removed. In this case, the bit mapper 1100 adjusts the image. Accordingly, the figure illustrates a video source or camera or scanner 1, the video digitizer 3 with an analog to digital converter and sync signal separator 4, the contrast selector 6, and bit mapper 1100 which adjusts the image to produce a distortion opposite to the one produced by the off axis display, the display processor or video DAC 500, video displays 600A and 600B, projector optics 700A and 700B, mirrors 800A and 800B, and spectacle lens 3000.

Figure 14A:
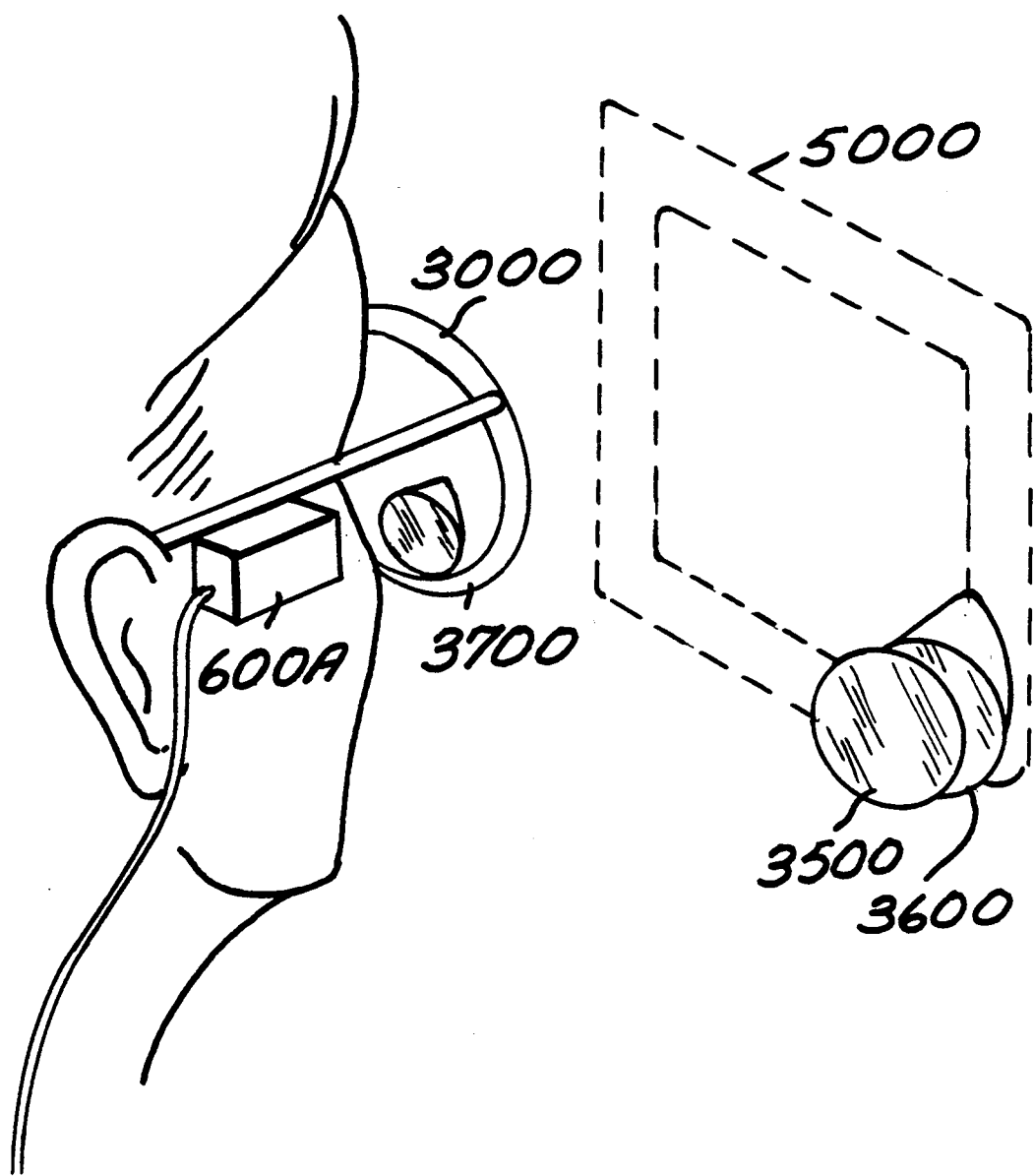
Figure 14C:
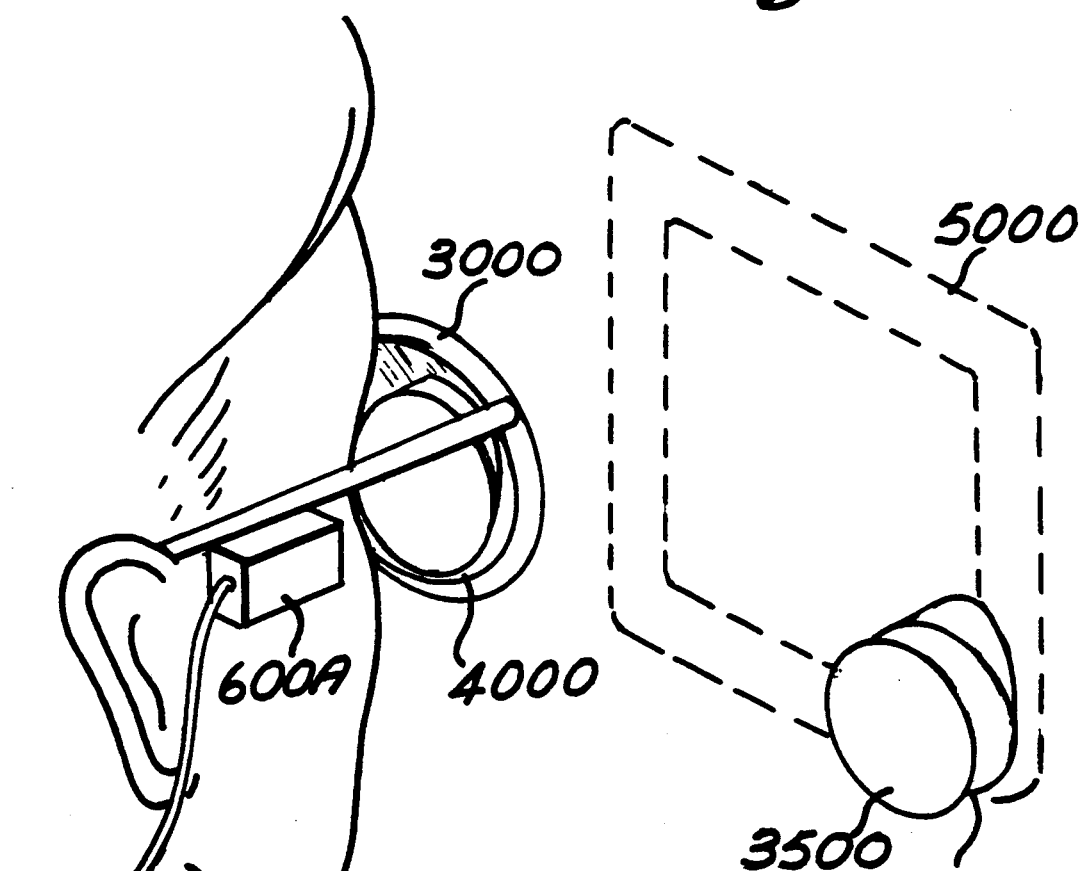

FIGS. 14A, 14B and 14C illustrate a partial spectacle mounted display. In these figures, the positions of the mounting mirror are shown. The mounting mirror is two components, a concave mirror 3500 and an ophthalmic prism 3600 to tilt the mirror to the correct angle. The mounting mirror can be positioned, as shown in FIG. 14A. The lower portion 3700 of the lens allows the user to look over the mounting mirror. The mounting mirror can be positioned, as shown in FIG. 14B. The upper portion 3800 of the lens allows the user to look under it. Additionally, the mirror can be positioned in the inside upper portion 3900 of the lens or, as shown in FIG. 14C, or in the center 4000 of the lens. The image 5000 is a virtual enlarged erect image which appears to float in space about fourteen or eighteen inches from the viewer's face. The mounting mirror can be made out of one piece of glass or plastic. The pieces are off the shelf components and items such as the liquid crystal displays, CRT video display and other display technology are available from manufacturers such as Sanyo or Sharp. The concave mirrors include parabolic and hyperbolic surfaces and are available from Edmund Scientific in Barrington, New Jersey. The front surface concave mirror 3600 is a 44 mm focal length catalog #43382. The ophthalmic prism 3700 and lenses are available from any full service ophthalmic laboratory such as Winchester Optical in Elmira, N.Y. The Analog Devices video DAC ADV7121 is a triple 10 bit video DAC which is capable of processing red, green and blue data, 254 shades of gray, plus white and black, plus two additional bits for enhanced spatial frequency information.

Figure 15:
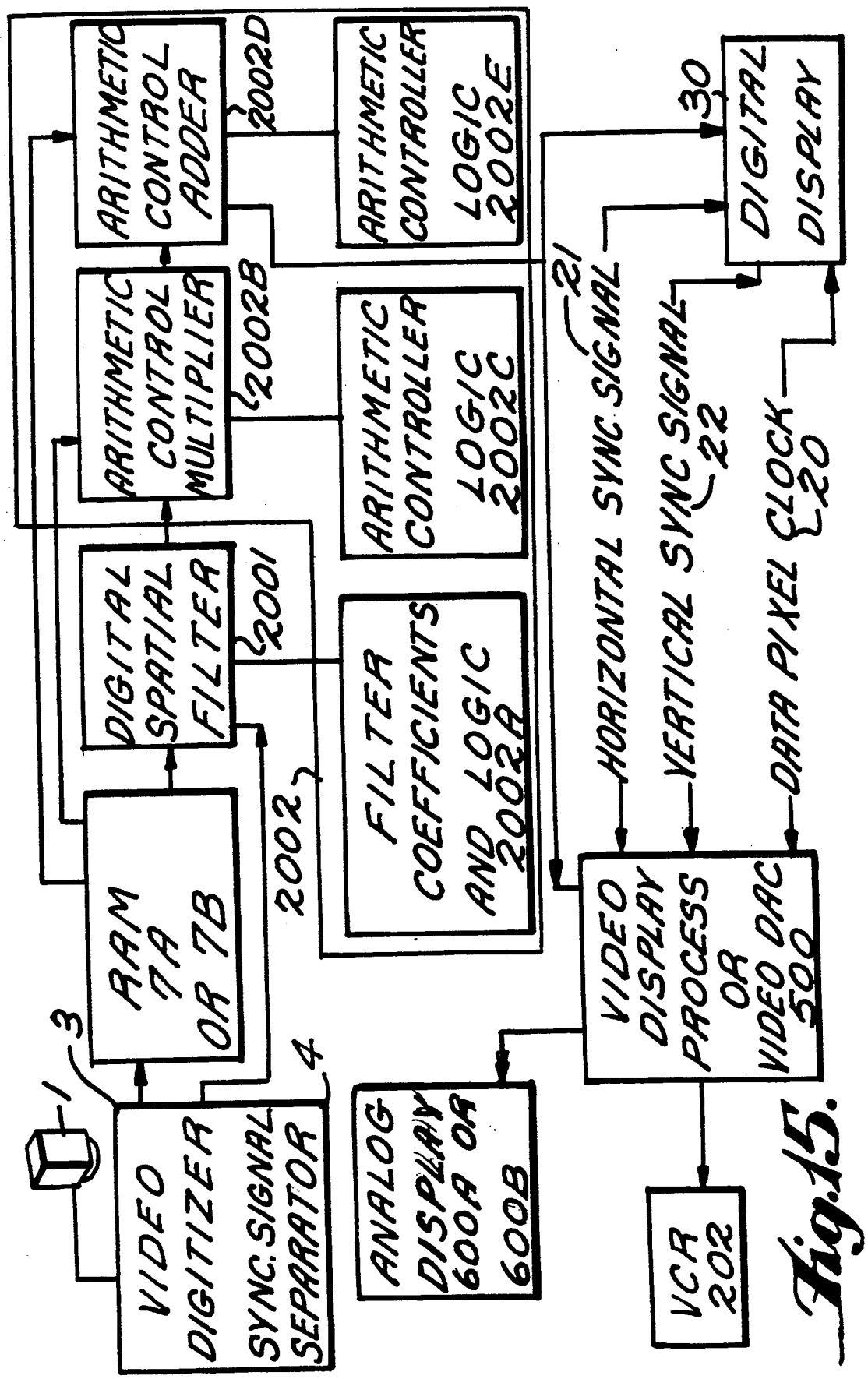
FIG. 15 shows a spatial frequency enhancer using an analog display.

FIG. 15 shows a spatial frequency enhancer using either analog or digital displays 600A or 600B or digital displays 30. Video camera 1 sends an analog signal 103 to video digitizer 3 which sends a digital video signal 5 to high speed memory RAM 7A or 7B. The digital video signal 5 is also sent to the digital spatial filter 2001 which selects the spatial frequency to be enhanced. The filter values and control logic are controlled by the spatial frequency and contrast control logic 2002. The control logic 2002 is composed of filter coefficients and logic 2002A, arithmetic control multiplier 2002B, arithmetic controller logic 2002C, arithmetic control adder 2002D, arithmetic controller logic 2002E. Once the enhanced frequency is selected, it is combined with the original image and displayed on a digital display 30 which receives data pixel clock 20, horizontal sync 21, and imager vertical sync signal 22 or the image will be sent to video DAC 500 which receives data pixel clock 20, horizontal sync signal 21, and vertical sync signal 22 and outputs a composite video signal to analog display 600A or 600B, or to VCR 202.

Figure 16:
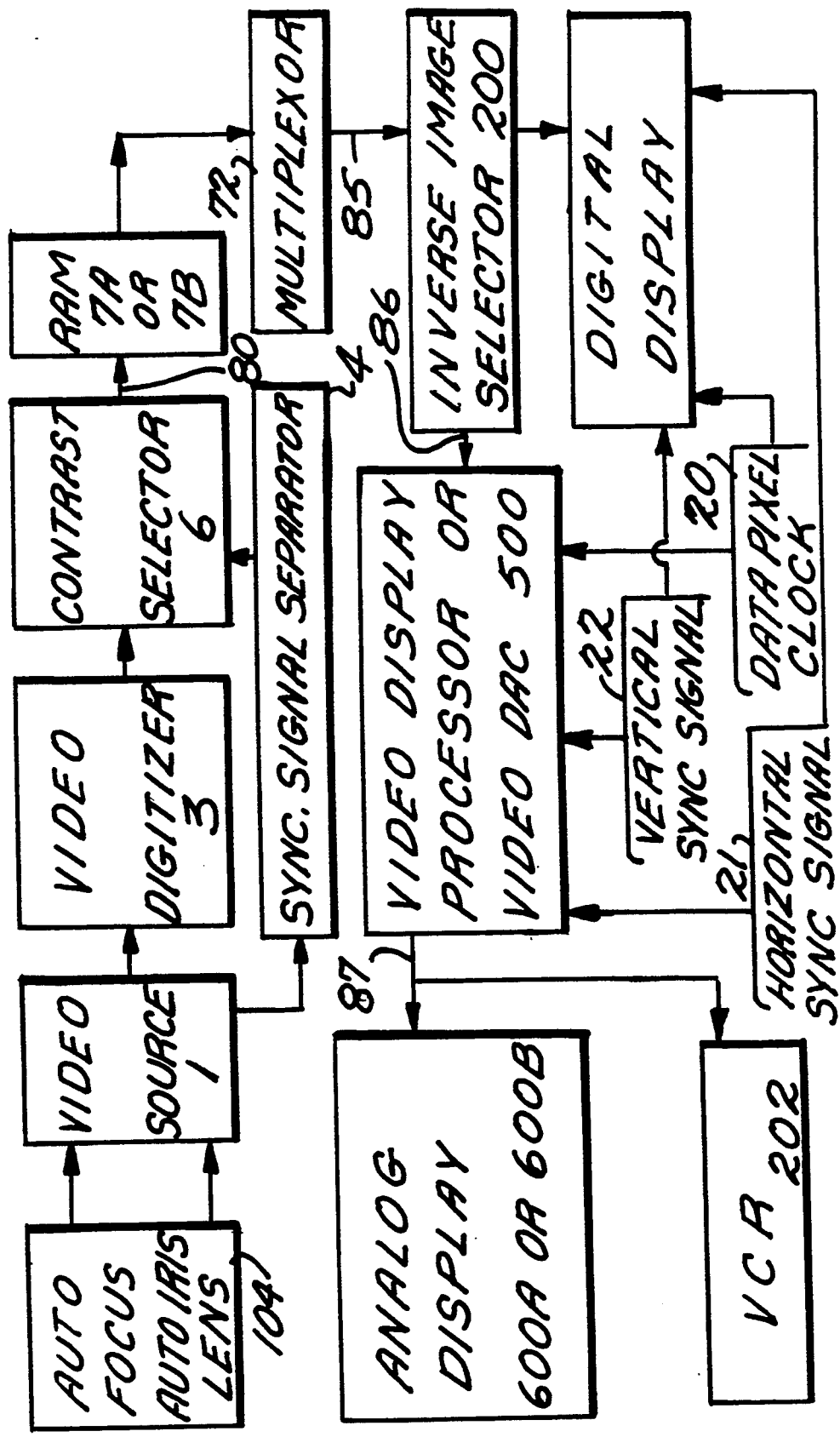
FIG. 16 shows a video display processor using an analog display.

FIG. 16 shows a digitally enhanced imager including a video display processor or video DAC, like Analog Devices ADV 7121, and analog display or VCR.

Printed matter, illuminated by internal light source 102 or images of the room and people's faces, is formed by an autofocus auto iris zoom lens 104. The video image 103 is formed by camera 1 and sent to an analog to digital convertor video digitizer 3, in which the signal is converted to a digital form. The composite analog signal also goes to a sync signal separator 4 where they are used to create the output sync signals such as previously discussed with reference to FIG. 1. The data portion 5 is transmitted to the contrast selector 6 which is used to enhance the contrast of the video image. Enhanced digitized video data 80 are sent to either high speed memory page 7A or 7B. A multiplexor 72 takes the appropriate image from memory 7A or 7B and sends the signal 85 to the inverse image selector 200 where positive or negative image is selected.

The signal 86 goes to the video display processor or video DAC 500 where it is combined with Data pixel clock 20, horizontal sync signal 21, and vertical sync signal 22 to form composite analog video output 87. This signal can be displayed on Analog Display 600A or 600B, VCR 202, or any standard television set. If digital display 30, or if 600A or 600B is a digital display, data signal 85 can be combined with the appropriate data pixel clock 20, horizontal sync signal 21, and vertical sync signal 22 to form a digital image which can be imaged in a person's eye using a projector or reflecting spectacle display 3000.

Figure 17:
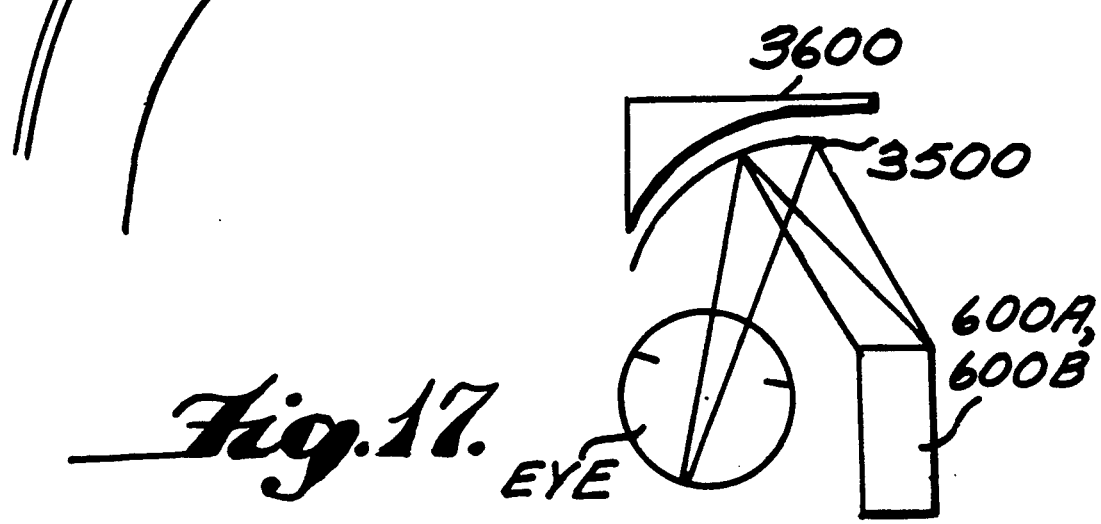
FIG. 17 shows an optical path of reflector spectacle using a video display with a curved mirror.

FIG. 17 shows the optical path of the proposed reflecting video display. A digital or analog video display 600A or 600B is reflected to a concave mirror 3500 which is positioned by an ophthalmic prism cemented to the back surface of the spectacle lens. After reflecting off the mirror the image is formed in the individual's eye by the focus of the concave mirror.

The description of the invention disclosed herein is illustrative of the invention. It is understood that alternative means such as programmable logic devices for intensity selection, various video displays, video recording devices, video sources including zoom, autofocus and autoiris lenses and other such features including sound recording ability are within the contemplation of this invention. Although the present invention uses an 8 bit analog to digital converter which produces 254 shades of gray, plus white and black and 15 output comparators to produce 14 shades of gray plus white and black, larger analog to digital converters are contemplated within the scope of this invention.

I claim:

1. Image enhancing video spectacles, comprising:
   a video signal digitizer for converting a received analog video signal to a digital video image having a data portion and a signal portion and for transmitting each said portion individually;
   sync signal separator receiving said signal portion from said video signal digitizer and for separating said signal portion into at least three separate signals;
   contrast selector receiving said data portion of said digitizer image, said contrast selector including means for comparing each pixel in said data portion to predetermined intensity levels, means for enhancing said data portion based on said comparison, and means for selecting at least one contrast level;
   means for selecting between 256 shades of gray, 16 shades of gray or black and white without gray shades, or any number of shades in between in a positive or negative image format;
   means for producing enlarged enhanced images in the user's eye;
   spatial frequency enhancer including at least one filter and control logic means to select a high, low or midrange spatial frequency and to enhance frequency contrast to make that frequency more visible;
   means for receiving sync signals from the sync signal separator and generating a plurality of clock timing signals including a vertical sync signal, horizontal sync signal and data pixel clock;
   video display means for receiving said digital data and timing signals to produce a new image, said digital data image for protecting into a persons's eyes;
   mirrored spectacles having mounting mirrors for receiving said image and for reflecting said image so an individual with impaired vision wearing the image enhancing video spectacles selects said at least one contrast level between pertinent features of the image or selects a specific spatial frequency of an image which is enhanced in order to limit the impairment of the individual's vision; and
   a spatial filter, preselected filter coefficients, arithmetic control multiplier and control logic, and arithmetic control adder and control logic for combining the enhanced spatial frequency information with the unprocessed image and project this information in a person's eye utilizing the spectacle mounted mirror.

2. The image enhancing video spectacles of claim 1, wherein said video display means comprises,
   a fiber optic bundle image rectifier for compensating any distortions produced by the image.

3. The image enhancing video spectacles of claim 1, wherein said mounting mirrors include,
   a concave mirror for producing a virtual image of the video image.

4. The image enhancing video spectacles of claim 1, wherein said control logic comprises,
   a video digital to analog converter for converting digital data to analog signals.

5. The image enhancing video spectacles of claim 4, wherein said control logic further comprises,
   clock generator receiving one of said three separate signals from said sync signal separator and for generating a plurality of clock timing signals,
   output horizontal counter, receiving one of said plurality of clock timing signals, for counting said clock signal and for associating a horizontal count with said clock signal, and
   output vertical counter, receiving one of said plurality of clock timing signals, for counting said clock signal and for associating a vertical count with said clock signal.

6. The image enhancing video spectacles of claim 4 wherein said control logic means comprises, a display processor for processing said at least three separate sync signals and said digitized video image.

7. The image enhancing video spectacles of claim 1, further comprising:
input horizontal counter receiving two of said at least three separate signals from said sync signal separator and for counting said clock signal and associating an input horizontal count to said clock signal, and
input vertical counter receiving two of said at least three separate signals from said sync signal separator and for counting said clock signal and associating an input vertical count to said clock signal.

8. The image enhancing video spectacles of claim 7, further comprising:
output vertical counter, receiving one of said plurality of clock timing signals, for counting said clock signal and for associating an output vertical count with said clock signal, and
output horizontal counter, receiving one of said plurality of clock timing signals, for counting said clock signal and for associating an output horizontal count with said clock signal.

9. The image enhancing video spectacles of claim 8, further comprising:
at least one input data multiplexor for receiving said input horizontal count, said input vertical count, said output horizontal count and said output vertical count, said input data multiplexor providing control signals based on said received counts,
at least one random access memory for storing said enhanced data portions received from said contrast selector, said memory controlled by said input data multiplexor which alternate storage of said enhanced data portion,
and an output multiplexor receiving said receiving stored data from said random access memory, said output multiplexor combining said stored data for display.

10. An image enhancing video spectacle display device, comprising:
a video signal digitizer for digitizing each color component of a received analog color video signal to a digital video image having a data portion and a signal portion and for transmitting each said portion individually,
sync signal separator receiving said signal portion from said video signal digitizer and for separating said signal portion into at least three separate signals,
enhancing means for receiving said data portion of said digitized video image, said enhancing means including means for comparing said data portion to predetermined intensity levels, means for enhancing said data portion based on said comparison, and means for selecting at least one contrast level to eliminate intermediate levels of intensity and maximize contrast between said data portion and the predetermined intensity levels,
control logic receiving said enhanced data portion and for determining a comparable enhanced frequency to combine with the video image and producing a displayable video image,
display processor means receiving said displayable video image and for processing a composite video signal, said display processor means having combining means for combining said digital data with at least one said sync signal,
spectacle display means for receiving said composite video signal and including a display for projecting said composite video signal, mounting mirrors receiving said projected composite video signal and reflecting said signal as an enlarged erect image,
clock generator receiving one of said three separate signals from said sync signal separator and for generating a plurality of clock timing signals,
input horizontal counter receiving two of said at least three separate signals from said sync signal separator and four counting said clock signal and associating an input horizontal count to said clock signal,
input vertical counter receiving two of said at least three separate signals from said sync signal separator and for counting said clock signal and associating an input vertical count to said clock signal,
output horizontal counter, receiving one of said plurality of clock timing signals, for counting said clock signal and for associating a horizontal count with said clock signal, and
output vertical counter, receiving one of said plurality of clock timing signals, for counting said clock signal and for associating a vertical count with said clock signal.

11. The image enhancing video spectacle display device of claim 10, wherein said enhancing means further comprises,
at least one selectable comparator receiving said data portion of said digitized video image and for comparing said data portion to predetermined intensity levels and for enhancing said data portion based on said comparison.

12. The image enhancing video spectacle display device of claim 10, wherein said enhancing means comprises,
a video digital to analog converter.

13. The image enhancing video spectacle display device of claim 10, further comprising
at least one input data multiplexor for receiving said input horizontal count, said input vertical count, said output horizontal count and said output vertical count, said data multiplexor providing control signals based on said received counts,
at least one random access memory for storing said enhanced data portions received from said enhancing means, said memory controlled by said input data multiplexor which alternates storage of said enhanced data portion,
and an output multiplexor receiving stored data from said memory random access memory, said output multiplexor combining said stored data for display.

14. The image enhancing video spectacle display device of claim 10, wherein said enhancing means includes a display processor.

15. The image enhancing video spectacle display device of claim 10, wherein said spectacle display means includes
at least one projector optics for projecting the composite video signal.

16. The image enhancing video spectacle display device of claim 10, wherein said spectacle display means includes at least one coherent fiber optic bundle for receiving the composite video signal and producing an undistorted video signal.

17. The image enhancing video spectacle display device of claim 10, comprising
a digital bit remapper for rectifying and compensating for distortions in said video image.

* * * * *